(12) United States Patent
Cross

(10) Patent No.: US 11,616,414 B2
(45) Date of Patent: Mar. 28, 2023

(54) ROTARY DEVICE, A MOTOR AND A METHOD OF COOLING A MOTOR

(71) Applicant: Integral Powertrain Ltd, Milton Keynes (GB)

(72) Inventor: Andrew Cross, Milton Keynes (GB)

(73) Assignee: Integral Powertrain Ltd.

( * ) Notice: Subject to any disclaimer, the term of this patent is extended or adjusted under 35 U.S.C. 154(b) by 945 days.

(21) Appl. No.: 16/322,879

(22) PCT Filed: Aug. 2, 2017

(86) PCT No.: PCT/GB2017/052252
§ 371 (c)(1),
(2) Date: Feb. 1, 2019

(87) PCT Pub. No.: WO2018/025040
PCT Pub. Date: Feb. 8, 2018

(65) Prior Publication Data
US 2022/0052578 A1    Feb. 17, 2022

(30) Foreign Application Priority Data
Aug. 2, 2016   (GB) .................................... 1613324

(51) Int. Cl.
*H02K 5/20*        (2006.01)
*H02K 5/24*        (2006.01)
(Continued)

(52) U.S. Cl.
CPC .............. *H02K 5/203* (2021.01); *H02K 5/24* (2013.01); *H02K 7/003* (2013.01); *H02K 9/19* (2013.01)

(58) Field of Classification Search
CPC ............ H02K 9/197; H02K 9/19; H02K 9/02; H02K 9/06; H02K 9/16; H02K 9/18;
(Continued)

(56) References Cited

U.S. PATENT DOCUMENTS

| | | | |
|---|---|---|---|
| 3,060,335 | A | 10/1962 | Greenwald |
| 3,240,967 | A | 3/1966  | Krastchew |

(Continued)

FOREIGN PATENT DOCUMENTS

| | | |
|---|---|---|
| DE | 3622231 | 1/1988 |
| DE | 9913199 | 10/2000 |

(Continued)

OTHER PUBLICATIONS

International Search Report for PCT/GB2017/052252 dated Oct. 20, 2017 (4 pages).

(Continued)

*Primary Examiner* — Bryan R Perez
(74) *Attorney, Agent, or Firm* — Conley Rose, P.C.

(57) ABSTRACT

The invention provides a motor for generating rotary power, the motor comprising: a stator for receiving electrical power; a rotor arranged coaxially with respect to the stator and having one or more magnets arranged thereon so that in response to the stator receiving the electrical power, the rotor is caused to rotate; the rotor comprising a rotor housing having an inner wall, the magnets being arranged around the housing, and wherein the inner wall has plural tortuous paths for the flow of coolant extending along the length of the rotor housing. Preferably, the motor has an output shaft arranged at least partially axially within the rotor housing; the inner wall being shaped for engagement with and so as to drive the output shaft.

21 Claims, 23 Drawing Sheets

(51) Int. Cl.
*H02K 7/00* (2006.01)
*H02K 9/19* (2006.01)

(58) Field of Classification Search
CPC .. H02K 9/20; H02K 1/32; H02K 1/12; H02K 1/20; H02K 1/182; H02K 1/2766; H02K 1/2706; H02K 5/20; H02K 5/02; H02K 5/04; H02K 5/08
See application file for complete search history.

(56) References Cited

U.S. PATENT DOCUMENTS

| | | | |
|---|---|---|---|
| 3,521,094 | A | 7/1970 | Renz |
| 4,350,908 | A | 9/1982 | Riffe |
| 4,647,805 | A | 3/1987 | Flygare |
| 4,692,644 | A | 9/1987 | Lenz |
| 5,424,593 | A | 6/1995 | Vaghani |
| 5,589,720 | A | 12/1996 | Berger |
| 5,704,111 | A | 1/1998 | Johnson |
| 7,579,725 | B2 | 8/2009 | Zhou |
| 8,022,582 | B2 | 9/2011 | Dames |
| 8,659,190 | B2 | 2/2014 | Chamberlain |
| 2006/0018774 | A1* | 1/2006 | Casaro .................. F16C 27/04 417/423.12 |
| 2011/0089777 | A1 | 4/2011 | Rivera et al. |
| 2015/0288255 | A1* | 10/2015 | Barker .................. H02K 9/197 310/43 |

FOREIGN PATENT DOCUMENTS

| | | |
|---|---|---|
| GB | 191416979 | 7/1914 |
| GB | 2483122 | 2/2012 |
| WO | 9009053 | 9/1990 |
| WO | 2010/040533 A2 | 4/2010 |
| WO | 2010040533 | 4/2010 |
| WO | 2014/057245 A2 | 4/2014 |
| WO | 2014057245 | 4/2014 |
| WO | 2015/068846 A1 | 5/2015 |
| WO | 2015068846 | 5/2015 |

OTHER PUBLICATIONS

Written Report PCT/GB2017/052252 dated Oct. 20, 2017 (7 pages).
English Abstract of WO2015068846.
EPO Office Action dated May 6, 2020, for Application No. 17752428.7.

* cited by examiner

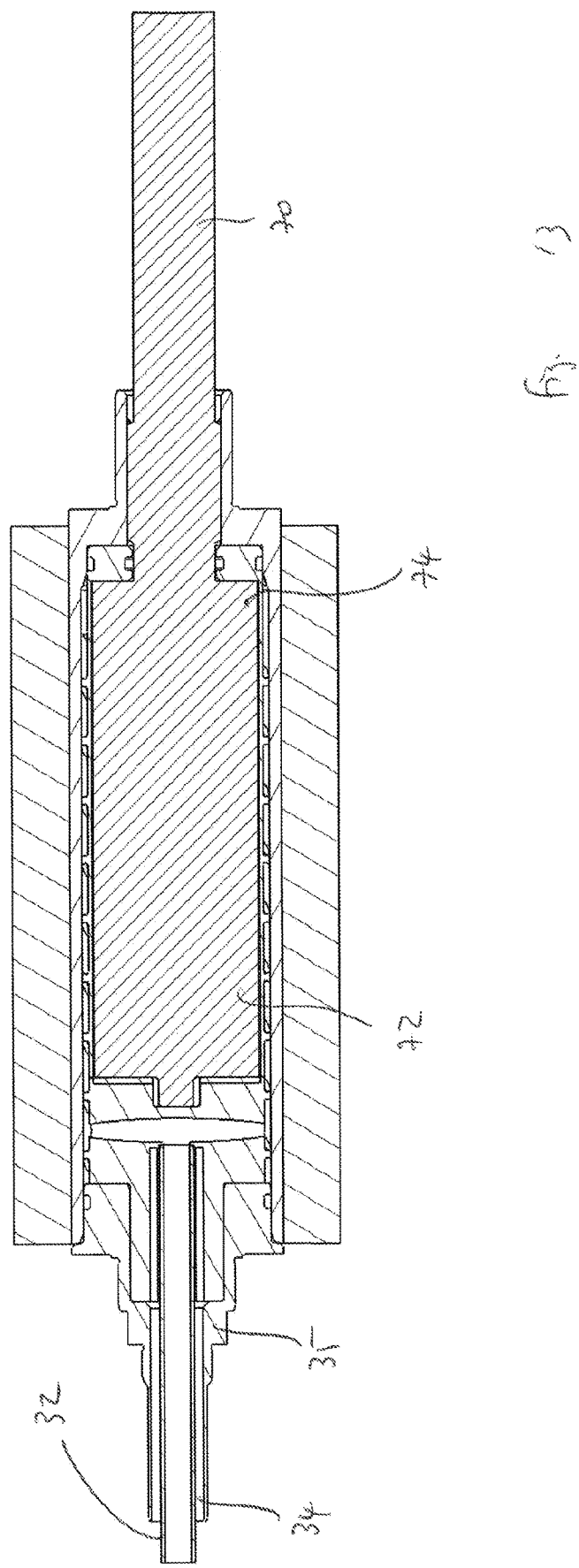

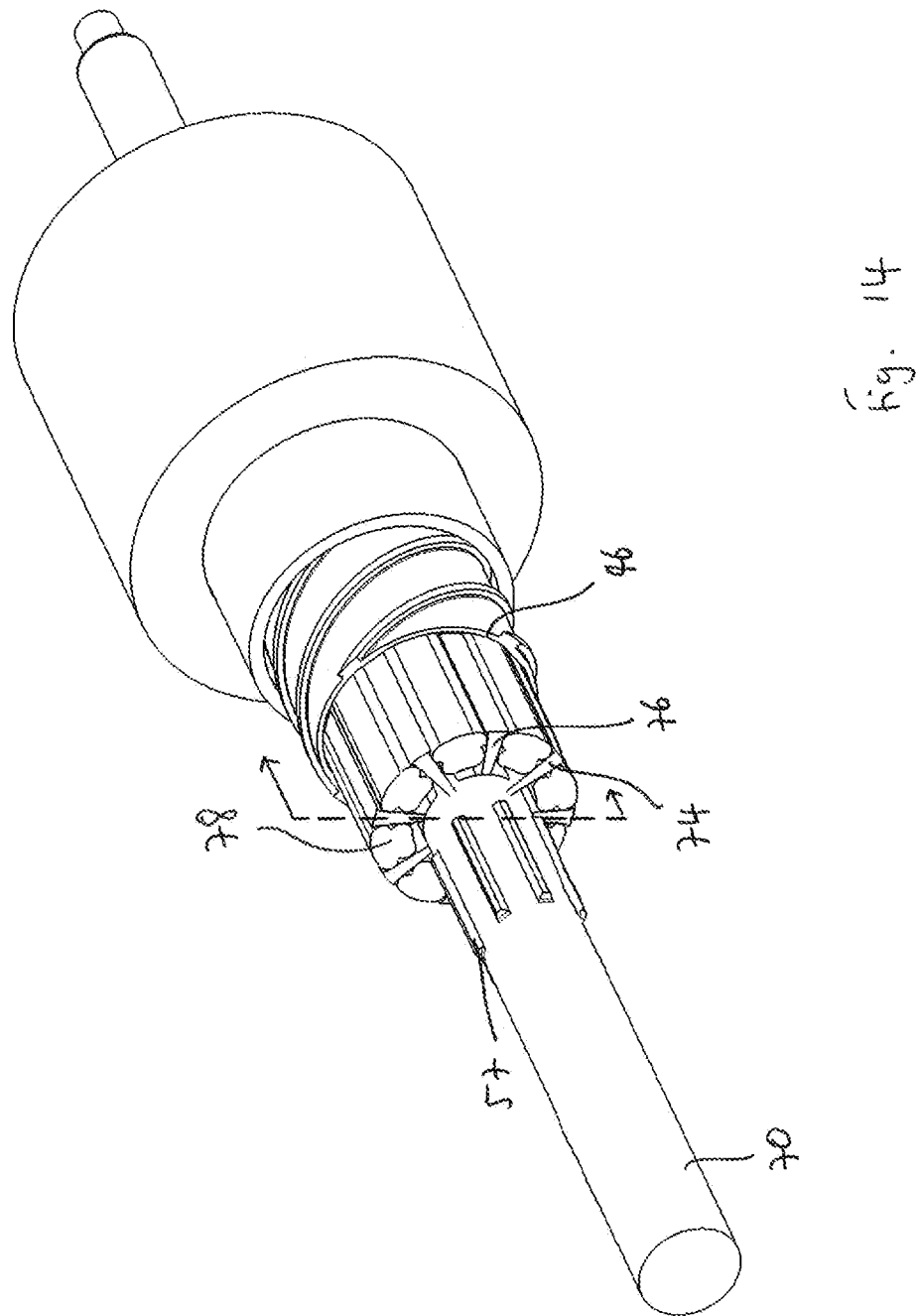

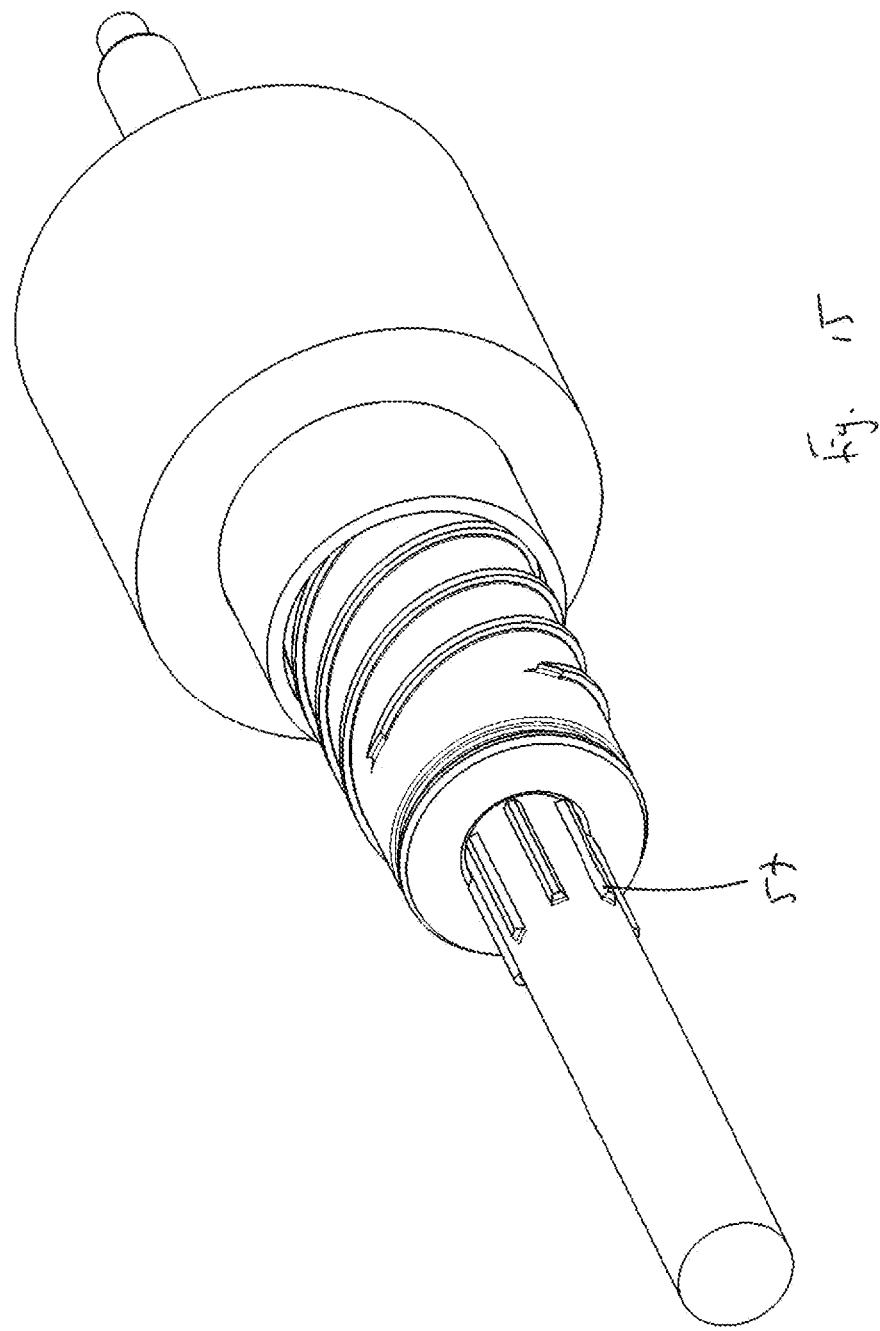

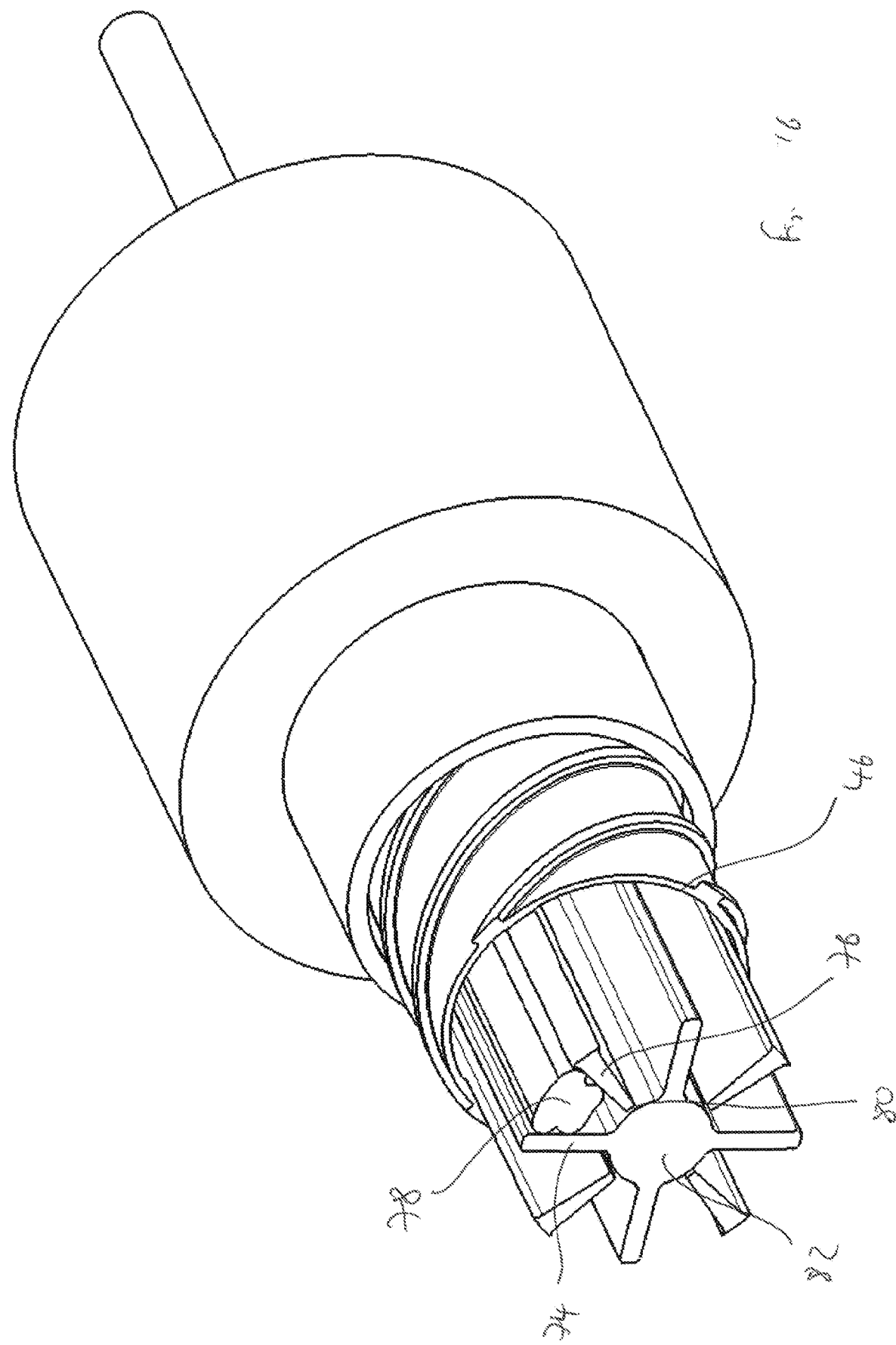

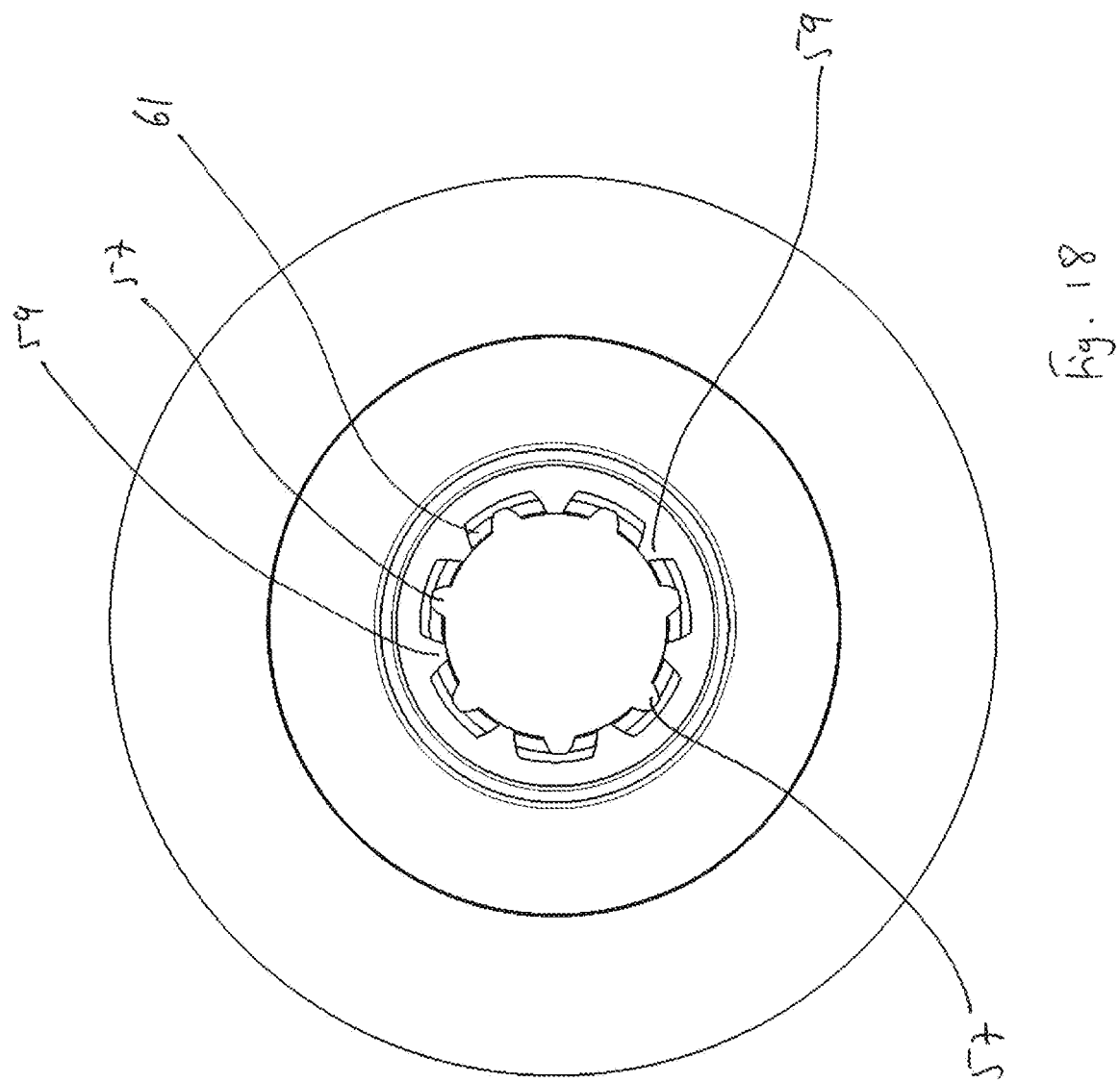

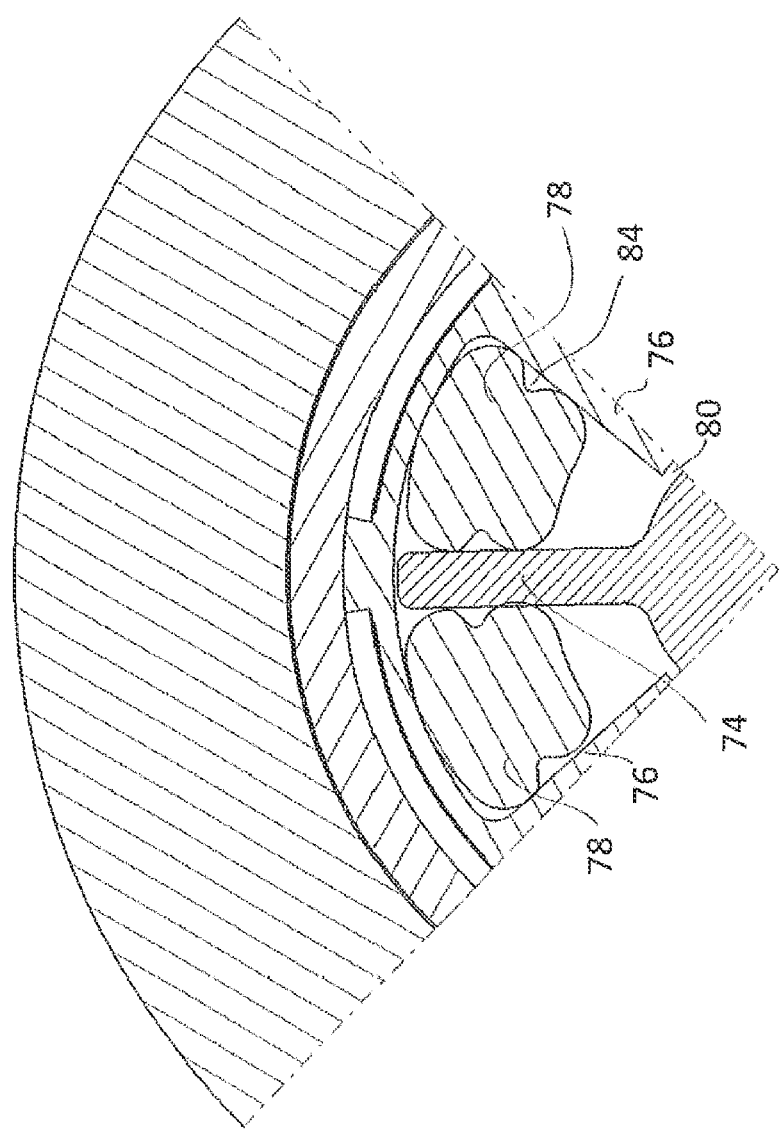

ROTARY DEVICE, A MOTOR AND A METHOD OF COOLING A MOTOR

CROSS REFERENCE TO RELATED APPLICATIONS

This application is the U.S. National Stage entry under 35 U.S.C. § 371 of International Patent Application No. PCT/GB2017/052252, filed Aug. 2, 2017, and entitled "A Rotary Device, A Motor And A Method Of Cooling A Motor," which claims priority to GB Application No. 1613324.1 on Aug. 2, 2016, entitled "A ROTARY DEVICE, A MOTOR AND A METHOD OF COOLING A MOTOR", all of which are incorporated by reference herein in their entireties for all purposes.

STATEMENT REGARDING FEDERALLY SPONSORED RESEARCH OR DEVELOPMENT

Not applicable.

BACKGROUND

The present invention relates to a rotary device, a motor and a method of cooling a motor.

Electric motors are used widely as a means of generating traction. However it is known that a problem that arises with traction motors is that significant heat can be generated within them. Cooling of the motor is important so as to avoid damage to thermally sensitive components within the motor. There is a desire to provide lower cost or more performance-dense motors. However, as will be explained below, motors that satisfy this desire can experience more significant heating of the rotor within the motor in normal operation.

A motor such as a three-phase synchronous motor will typically include both a stator and a rotor. The stator is arranged, in use to receive electrical power so as to generate a varying magnetic field. The rotor, arranged coaxially within and typically enclosed by the stator, comprises a number of permanent magnets which, under the influence of the varying magnetic field, cause the rotor to rotate. Thus, by the provision of electrical power, a rotational output can be derived. Substantially the same apparatus can be used in a reverse order to generate electricity. In other words, if the rotor is driven by rotational drive input, voltage will be generated in the stator coils.

In our co-pending international patent application, WO-A-2014/057245, there is described a rotary device, a motor and a method of cooling a motor. The entire contents of this document are hereby incorporated by reference.

As explained in WO-A-2014/057245, a rotary device is provided including a stator for receiving or outputting electrical power. A rotor is arranged coaxially within the stator and has one or more magnets arranged thereon. The rotor comprises a rotor housing having an inner wall, the magnets being arranged around the housing and wherein the rotor also comprises a conduit having an axial component for the flow of a coolant between a first end of the rotor and a second distal end of the rotor. The rotor further comprises one or more radial fluid conduits, the radial fluid conduits being fluidly coupled to the axial fluid conduit and arranged in use to receive coolant from or provide coolant to the axial fluid conduit, the inner wall having one or more fluid paths for the flow of coolant. Thus, by flowing coolant along the one or more fluid paths, the rotor is cooled.

The rotary device, motor and method described in WO-A-2014/057245 works very well. A means is desired by which to provide an alternative output from such a rotary device.

Other examples of fluid-cooled rotor devices or motors are described in U.S. Pat. Nos. 7,579,725, 4,647,805, 5,589,720, WO-A-90/09053, DE-A-19913199, U.S. Pat. Nos. 4,692,644, 8,022,582, US-A-2001/0308071, U.S. Pat. Nos. 3,521,094, 3,060,335, 3,240,967, 4,350,908, 5,424,593, GB-A-16979, GB-A-2,483,122 and DE-A-3,622,231.

BRIEF SUMMARY OF THE DISCLOSURE

According to a first aspect of the present disclosure, there is provided a motor for generating rotary power, the motor comprising: a stator for receiving electrical power; a rotor arranged coaxially within the stator and having one or more magnets arranged thereon so that in response to the stator receiving the electrical power, the rotor is caused to rotate, the rotor comprising a rotor housing having an inner wall and first and second ends, and wherein the housing has one or more paths, such as tortuous paths, for the flow of coolant extending along the length of the rotor housing, and being configured to direct flow from the first end of the rotor housing to the second end and back to the first end.

A motor is provided with one or more tortuous paths for coolant. The tortuous paths are arranged for the flow of a coolant on the rotor housing in two directions. First, coolant is able to flow from a first input end to a second distal end and then the fluid is redirected to flow in the opposite axial direction still on the rotor housing. Thus, no room or means for fluid flow is needed within the rotor housing itself which means that this space can be used for other functions. No central axial conduit is required or provided for the flow of coolant and so the volume within the rotor can remain empty. Indeed in some embodiments a central void is defined within the rotor housing by virtue of there being no central conduit for the flow of a coolant. This means that the mass of the rotor (and motor) as a whole can be reduced.

In an embodiment, the output shaft is arranged at least partially axially within the rotor housing, the inner wall being shaped for engagement with and so as to drive the output shaft.

The present motor comprises an output shaft at least partially axially within the rotor housing whilst still enabling fluid cooling on a surface of the rotor housing. The motor includes tortuous paths for the flow of a coolant and provide for flow on the rotor housing of coolant in two directions. First, coolant is able to flow from a first input end to a second distal end and then the fluid is redirected to flow in the opposite axial direction still on the rotor housing. Thus no room or means for fluid flow is needed within the rotor housing itself which means that this space can be used for other functions. In the present system this room or space is used to enclose the output shaft of the rotor which means that a compact and efficient motor is provided. The space that is provided within the rotor is freed up for any other required or desired function. One example is to incorporate a torsional vibration damper. Such a torsional vibration damper may be used to alter the characteristics of, and provided damping within, an overall powertrain system in which the motor could be provided, so as to increase drivetrain durability and/or improve noise, vibration and harshness (NVH). One non-limiting example of a torsional vibration damper is the use of elastomeric elements to couple the rotor to the output shaft. Another is a hydraulic damper where a fluid such as oil is forced between 2 or more chambers as torque is applied or resisted by the motor rotor to or from the output shaft.

In addition the use of a double pass fluid path for the coolant ensures that the maximum temperature difference between the first and second ends of the rotor is minimised and thus overall the maximum rotor temperature is minimised. In one example the temperature difference between the first and second ends is 7° C. which is reduced by a factor of 2 to 3.5° C. by employing the double pass design. In the system of WO-A-2014/057245 the average temperature of the rotor and coolant varies along its length due to the fact that heat is picked up by the coolant as it flows along the length of the tortuous paths. At entry to the tortuous paths, the coolant is at a starting temperature, $T_1$. As it passes down the length of the rotor it picks up heat such that the average temperature of the coolant at the second end will be, say, $T_2$.

The temperature rise will have been caused by receiving heat of say Q=1 during its passage. At any point along the length of the rotor taking the average temperature of all the coolant at that same axial position, there is a variation in the temperature which might typically be linearly related to the axial position and the overall temperature difference. By contrast, in the present system, due to the double pass flow system, the average temperature of all the coolant at that same axial position, will be substantially constant since at any axial position there will be some coolant flowing one way and some flowing the other in counter-parallel paths. The average will be substantially constant.

In an embodiment, the motor comprises one or more elastomeric elements within the housing configured to drive the output shaft upon operation of the motor.

In this embodiment, one or more elastomeric elements are used to couple rotation of the rotor to the output shaft. The space provided or freed up within the rotor housing as a consequence of providing bidirectional coolant flow on the rotor housing itself is used for providing one or more elastomeric coupling members. This is particularly advantageous since it enables a damped and/or low stiffness coupling of the rotation of the rotor to the output shaft. In some applications, such as use of the motor within a hybrid engine of a motor vehicle this is useful as damping and/or low stiffness is advantageous when coupling the power from the shaft to an internal combustion engine.

In an embodiment, the rotor housing has a substantially cylindrical shape outer shape and the inner wall of the housing has one or more radial projections for engagement with the one or more elastomeric elements.

In an embodiment, the radial projections are radial fins projecting axially inwards towards the output shaft.

In an embodiment, the output shaft has a plurality of outwardly projecting radial fins interdigitated with the inwardly projecting radial fins of the rotor housing.

In an embodiment, there are defined between the inwardly projecting fins and the outwardly projecting fins angular sectors and wherein the elastomeric elements are provided within the sector regions.

In an embodiment, the radial projections are defined as part of a contoured inner surface of the rotor housing.

In an embodiment, the output shaft has a contoured surface having one or more recesses to define with the contours of the rotor housing longitudinal voids for housing the one or more elastomeric elements.

In an embodiment, the motor comprises a plurality of elastomeric elements in the form of longitudinal members.

In an embodiment, the longitudinal members are cylindrical.

In an embodiment, the tortuous paths are helical.

In an embodiment, the tortuous paths are defined between 2 concentric layers of the inner wall.

In an embodiment, one of the concentric layers has helical ribs formed thereon to define in combination with the other the helical paths.

In an embodiment, there are two helical paths in which fluid in use flows from the first end to the second two helical paths in which fluid in use flows from the second end to the first end.

In an embodiment, the helix angle is between 30° and 45°.

In an embodiment, the elastomeric elements are formed of a material selected from the following: natural or nitrile rubber, flouroelastomer, silicone or other polymer.

In an embodiment, the length of the or each elastomeric element is at least 80% of the length of the rotor housing.

According to a second aspect of the present disclosure, there is provided a method of operating a motor, wherein the motor comprises a stator for receiving electrical power and a rotor arranged coaxially within the stator, the rotor comprising a rotor housing having first and second ends, and wherein the housing has one or more tortuous paths for the flow of coolant extending along the length of the rotor housing, and the rotor has an output shaft coupled thereto, the method comprising: providing flow of a coolant from the first end of the rotor housing to the second end and back to the first end: providing electrical power to the stator so as to cause the rotor to rotate.

In an embodiment, the method comprises providing elastomeric elements to provide the coupling of the rotor to the output shaft.

According to a further aspect of the present disclosure, there is provided a motor for generating rotary power, the motor comprising: a stator for receiving electrical power; a rotor arranged coaxially with respect to, or within, the stator and having one or more magnets arranged thereon so that in response to the stator receiving the electrical power, the rotor is caused to rotate; the rotor comprising a rotor housing having an inner wall, the magnets being arranged around the housing, and wherein the inner wall has plural tortuous paths for the flow of coolant extending along the length of the rotor housing; an output shaft arranged at least partially axially within the rotor housing; the inner wall being shaped for engagement with and so as to drive the output shaft According to a further aspect of the present disclosure, there is provided a rotary device for generating electricity, the rotary device comprising: a stator having windings; a rotor arranged coaxially with respect to, or within the stator and having one or more magnets arranged thereon so that in response to the rotor being driven in a rotary manner, electrical power is generated within the windings of the stator; the rotor comprising a rotor housing having first and second ends, the magnets being arranged around the housing, and wherein the housing has one or more tortuous paths for the flow of coolant extending along the length of the rotor housing, and being configured to direct flow from the first end of the rotor housing to the second end and back to the first end.

According to a further aspect of the present disclosure, there is provided a method of generating electricity using a rotary device comprising a stator having windings, a rotor arranged coaxially with respect to, or within the stator and having one or more magnets arranged thereon, wherein the rotor includes a rotor housing having first and second ends, and one or more tortuous paths for the flow of coolant extending along the length of the rotor housing, and being configured to direct flow from the first end of the rotor housing to the second end and back to the first end, the method comprising: providing rotary power so as to cause the rotor to turn and thereby generate electrical power in the stator windings.

The rotary device for generating electricity, in terms of components, is the same as the motor of the first aspect but instead of being driven by electricity to generate rotary power, rotary power is provided as an input so as to generate electricity in the form of a generated voltage in the windings of the stator. Accordingly, any of the features described above as being provided "in an embodiment" (or indeed listed in the dependent claims at the end of the specification) could be provided with the rotary device for generating electricity.

BRIEF DESCRIPTION OF THE DRAWINGS

Exemplary embodiments of the disclosure will now be described in detail with reference to the accompanying drawings, in which:

FIG. 15 is a perspective view of the rotary device of FIGS. 11 and 12 with a number of the outer components removed;

FIG. 16 is a perspective view of the rotary device of FIGS. 11 and 12 with a number of the outer components removed;

FIG. 17 is a schematic view of the rotary device of FIG. 11 cut off at one longitudinal end to show the output shaft;

FIG. 18 is an end face view of the device of FIG. 17;

FIG. 19 is a quadrant of a transverse section through the rotary device of FIGS. 11 and 12.

DETAILED DESCRIPTION OF THE DISCLOSED EXEMPLARY EMBODIMENTS

Figure 1:
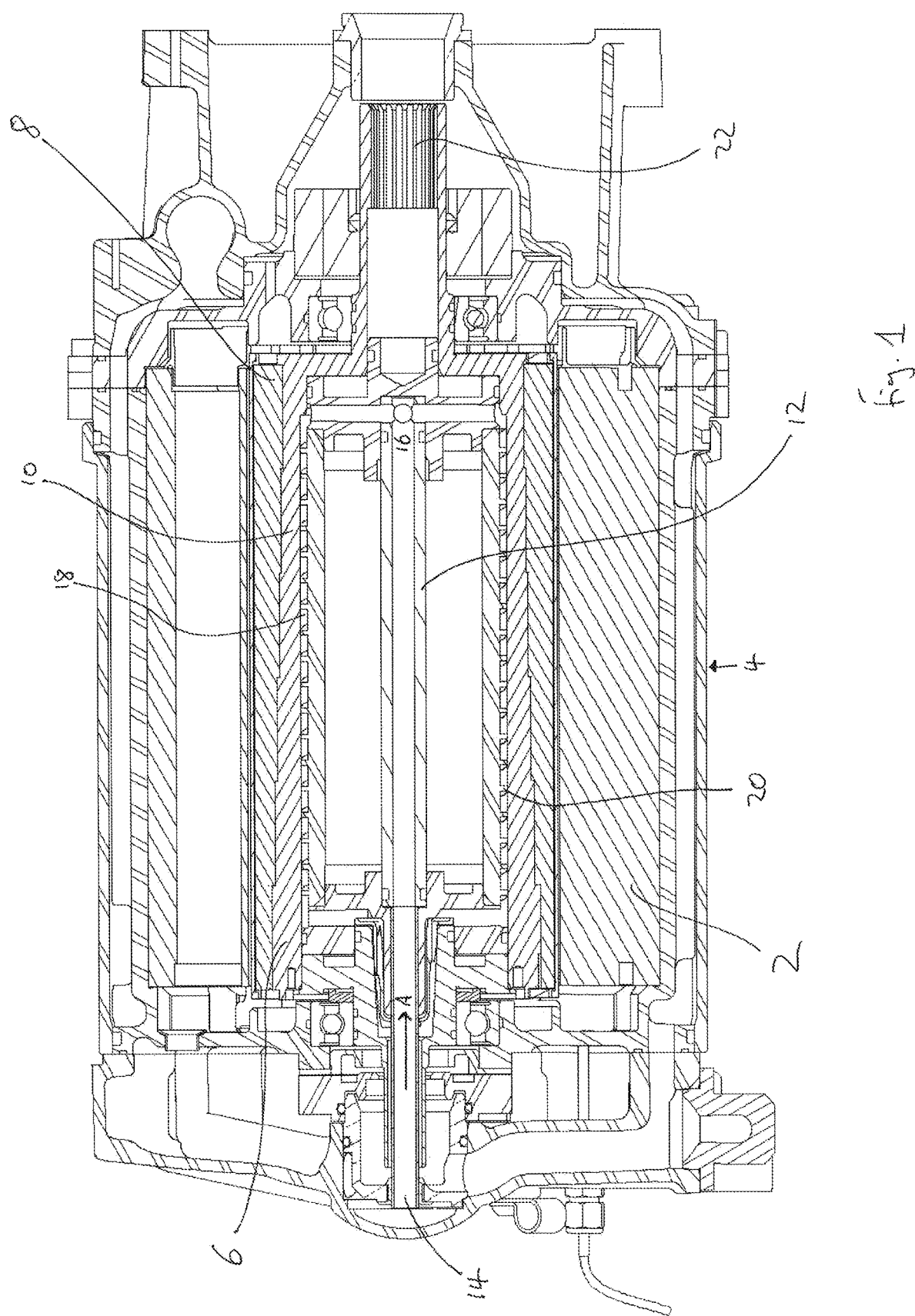
FIG. 1 is a schematic representation of a rotary device as disclosed in and described in WO-A-2014/057245.

FIG. 1 shows a schematic representation of a longitudinal cross-section through a rotary device of the type described in our co-pending application WO-A-2014/057245. The device comprises a stator 2 which typically comprises windings (not shown). The stator 2 is arranged within a casing 4 of the rotary device assembly. Arranged within the motor assembly is a rotor designated generally at 6. In this example the rotor is arranged within the stator although it will be appreciated that the arrangement could be the other way round, i.e. the stator arranged within the rotor. More generally then, the rotor can be said to be arranged coaxially with respect to the stator.

Referring again to FIG. 1, the rotor comprises magnets 8 arranged around a rotor housing 10. The magnets are preferably permanent magnets which include materials such as dysprosium. The rotor 6 is arranged to rotate due to the interaction of the magnets 10 with the powered windings 2 forming the stator. In other words, as power is supplied to the windings, interaction between the magnetic fields of the windings and the magnets 8 causes the rotor to rotate.

A cooling mechanism is provided in the form of an axial conduit 12 arranged axially centrally within the rotor. Fluid enters from first end 14, flows axially down the rotor in the direction A and then radially outwards at second end 16 of the conduit 12. The cooling fluid then returns via helical paths 18 defined by interaction between a helical groove 20 and the wall 10 of the rotor 6.

Splines 22 are provided at the distal end of the rotary device and are used to engage with an output shaft (not shown).

As explained above, the rotary device works well however, a means is desired by which to provide an alternative output from such a rotary device.

The present rotary device provides an arrangement in which the axial conduit for cooling fluid is not required. This is achieved with the use of bidirectional tortuous paths on an outer surface of a rotor housing, thereby providing more available space or volume within the rotary device which can then be used for incorporation of other elements. In particular examples, the space made available is used for inclusion of low-stiffness and high-damping elements, e.g. elastomeric elements, for mitigation of torsional vibration which is a problem common in hybrid vehicle applications, where the motor is connected to an internal combustion engine. In other words, in certain embodiments, an elastomeric material is used to provide a damped drive to an output shaft from the motor.

In contrast to the system of FIG. 1, in which rotary output is derived from the splined output member 22, in the present system bidirectional tortuous paths are provided within the rotor and arranged on the rotor housing which mean that the central fluid input is not required. This in turn enables a damped rotary output to be easily achieved within the same device volume or footprint as that of the system of FIG. 1.

Furthermore, by doing without the axial conduit, the design of the present rotary device is simpler than that of the previous device described in our co-pending application WO-A-2014/057245, having both a lower parts count and a lower seal count. The description below relates to a motor, although it will be appreciated that, operated by having rotary power provided as an input, the device can operate as a rotary device for generating electrical power.

Figure 2:
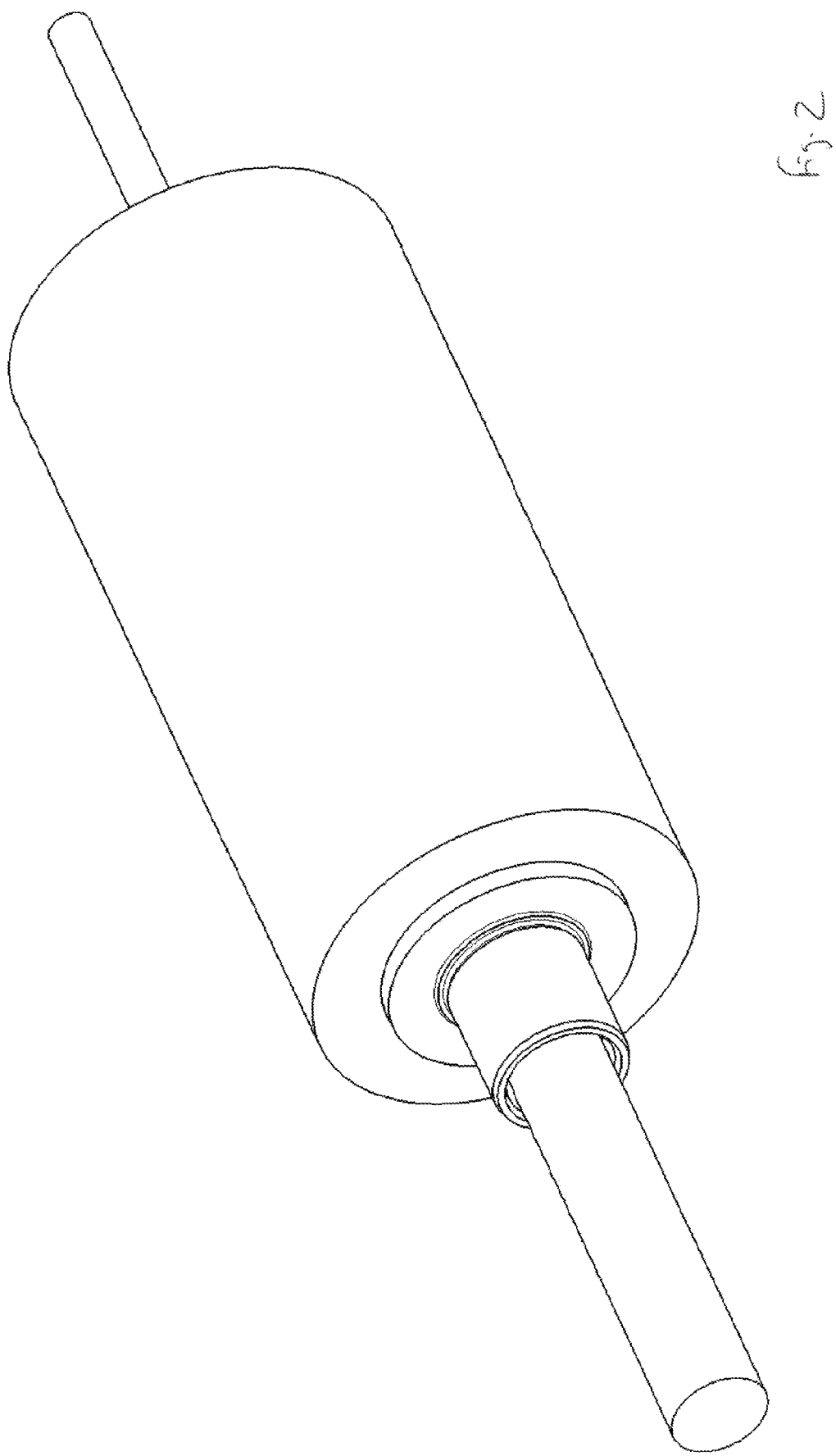
FIG. 2 is a schematic representation of a rotary device.

FIG. 2 is a schematic perspective view from above of a rotary device. The outer housing can be seen which is a stator housing and contains a plurality of windings used as an electromagnet to engage with permanent magnets provided on the rotor, to be described below.

Figure 3:
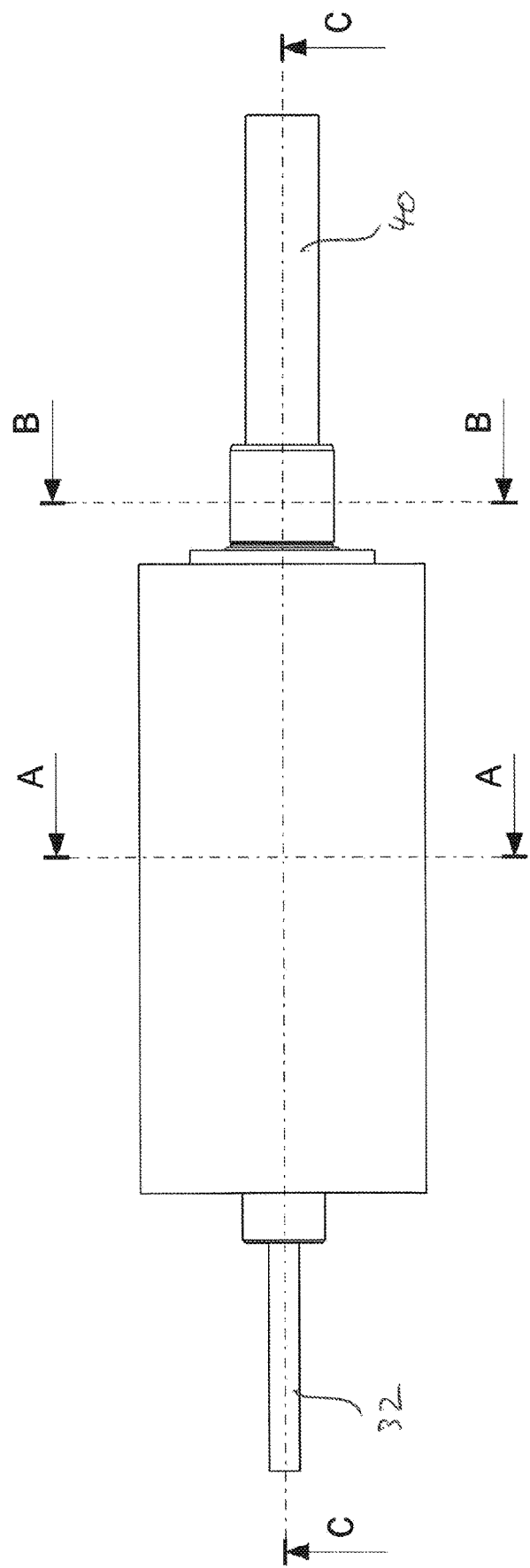
FIG. 3 is a side view of the rotary device of FIG. 2.

FIG. 3 is a side view of the rotary device of FIG. 2. A number of sections are represented schematically and these will be described in detail below.

Figure 4:
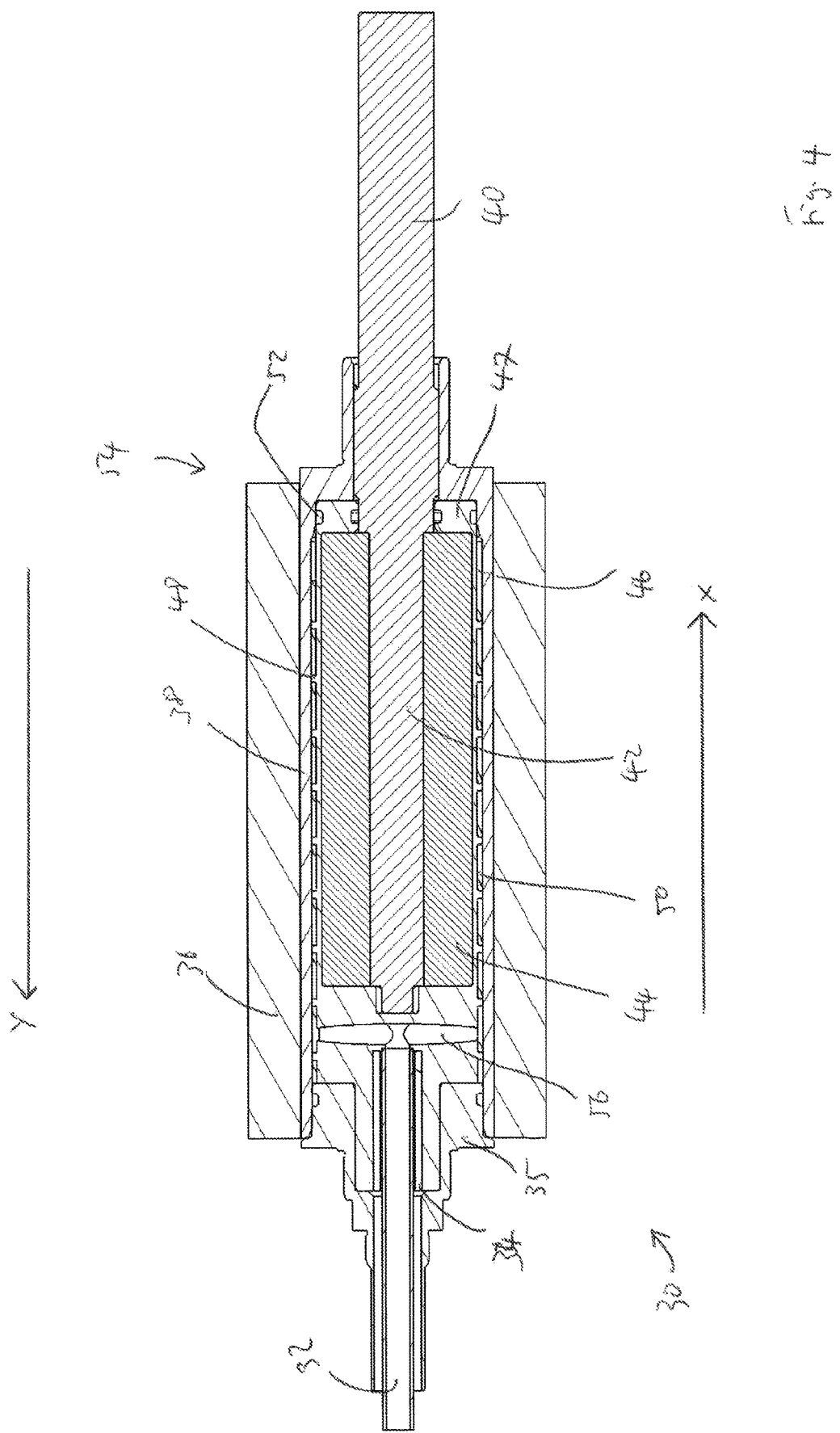
FIG. 4 is a longitudinal cross-sectional view of the rotary device of FIGS. 2 and 3.
Figure 5:
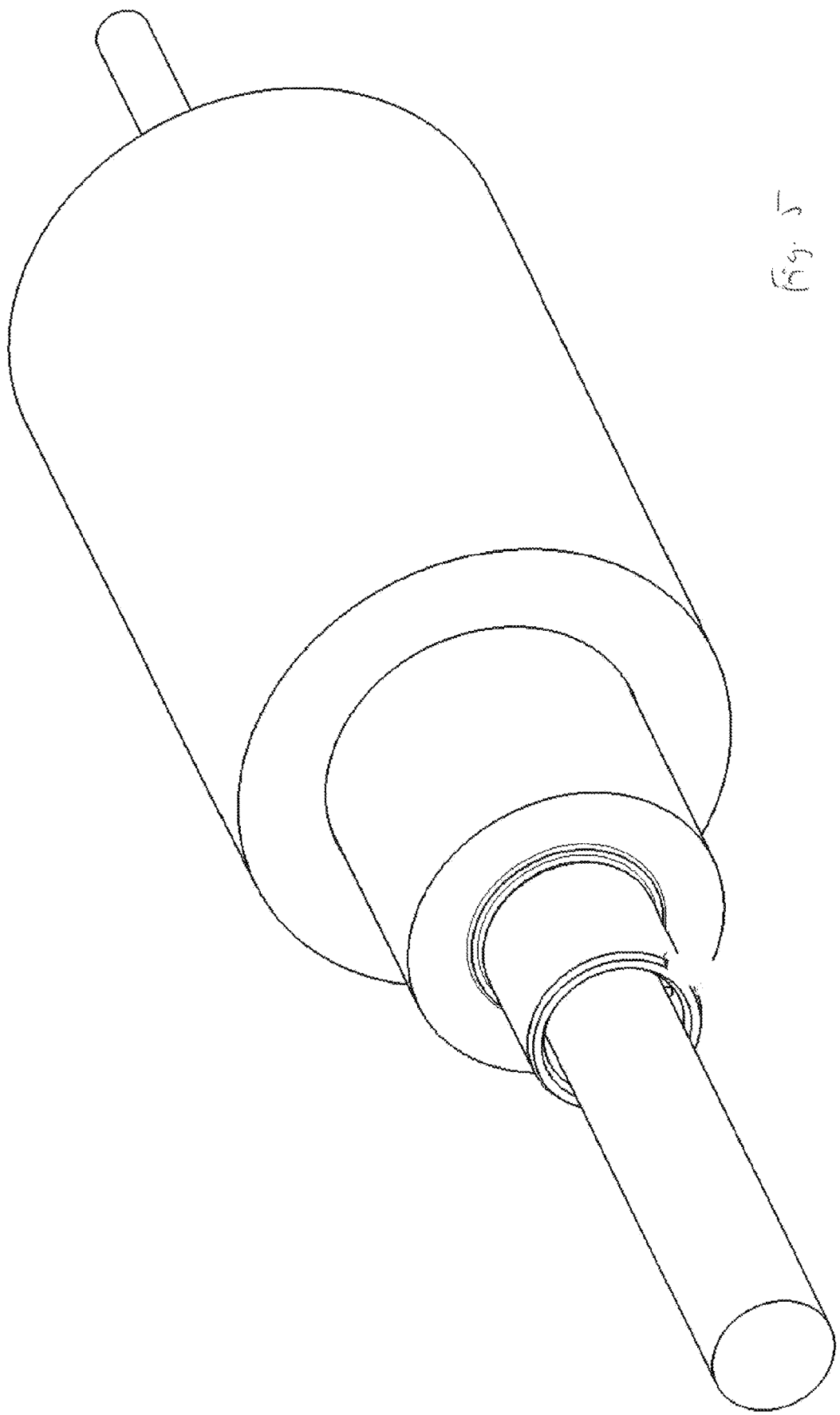
FIG. 5 is a perspective view of the rotary device of FIGS. 1 and 2 with part of the outer housing shown removed.

Turning now to FIG. 4, a longitudinal cross-section through the rotary device of FIGS. 2 and 3 is shown. The rotary device 30 comprises an axial inlet 32 for receiving a cooling fluid. A coaxial outlet 42 is provided surrounding the inlet tube 32. The rotor comprises magnets 36 provided around an inner housing of the rotor 30. A drive shaft 40 is provided coupled to an upstream section 42 arranged within the housing of the rotor. Elastomeric elements 44 are provided within the rotor and, as will be described below, when the rotor is driven to rotate, a rotary force is applied to the elastomeric elements 44 which, in turn, drives rotation of the drive shaft 40. Preferably the elastomeric elements extend for the full (or substantially the full) axial length of the inner housing 38.

The rotor housing comprises a substantially cylindrical inner wall 46 having formed thereon paths, which may be tortuous. In this case a helical rib or ribs 48 is or are provided defining between the walls 46 and 38 one or more helical paths 50. The inner wall is closed at the distal end by circular end wall 47. End wall 47 may be integral with or separately fitted into the cylindrical inner wall 46. Input wall 35 is provided at the first end of the rotor and serves to close the rotor and provide support for the inlet conduit 32. Furthermore it serves to define the flow path 34 for fluid leaving the rotor.

The tortuous or helical paths are defined between the walls 46 and 38. The walls are concentric cylindrical layers. In one example this is achieved by the inner surface of outer wall 38 being circular in cross section and the inner wall 46 having formed thereon helical ribs, which are enclosed by the outer wall thereby defining the helical or tortuous paths. In another example the helical ribs can be formed on the inner surface of the outer wall 38 with the inner wall 46 cooperating with them so as to define the helical paths. In another example corresponding helical grooves are formed in one or both of the walls to define the helical paths. A static O ring is provided 52. This provides a seal between the inner wall 46 and the rotor housing wall 38.

The helical path 50 may be referred to as a double-pass helical path for coolant since the path for coolant entering by inlet 32 and then leaving by outlet 34 involves passing along the helical path first in a direction from the inlet 32 to the outlet end 54 (in the direction X) and then subsequently in the axial direction Y from the end 54 back towards the outlet 34. The coolant used may be any appropriate coolant such as water or oil.

At the inlet end, a radial path 56 is provided and, in use, receives coolant via the inlet path 32. The coolant then flows radially outwards along the radial path 56 and into the helical path 50. The fluid then flows along the path picking up heat as it goes until it reaches the far end of the rotor 30 at which point, it, due to pressure differentials, enters another helical path parallel but counter-directional to the inlet path and flows along the helical path in the general axial direction Y. At the end of the helical path, the fluid flows radially inwards along a radial conduit (not shown in FIG. 4) and into outlet path 34 from which the fluid can be removed from the rotary device.

An end stop is provided at the distal end of the rotor which serves to direct the fluid back along parallel and interleaved tortuous paths once it reaches the rotor distal end. The fluid pressure and direction of fluid flow is sufficient to ensure that there is no backflow of fluid along the tortuous paths that delivered the fluid to the distal end of the rotor. The rotor housing is preferably formed of a material such as an iron, aluminium, copper or nickel alloy or ceramic such as Alumina.

Figure 6:
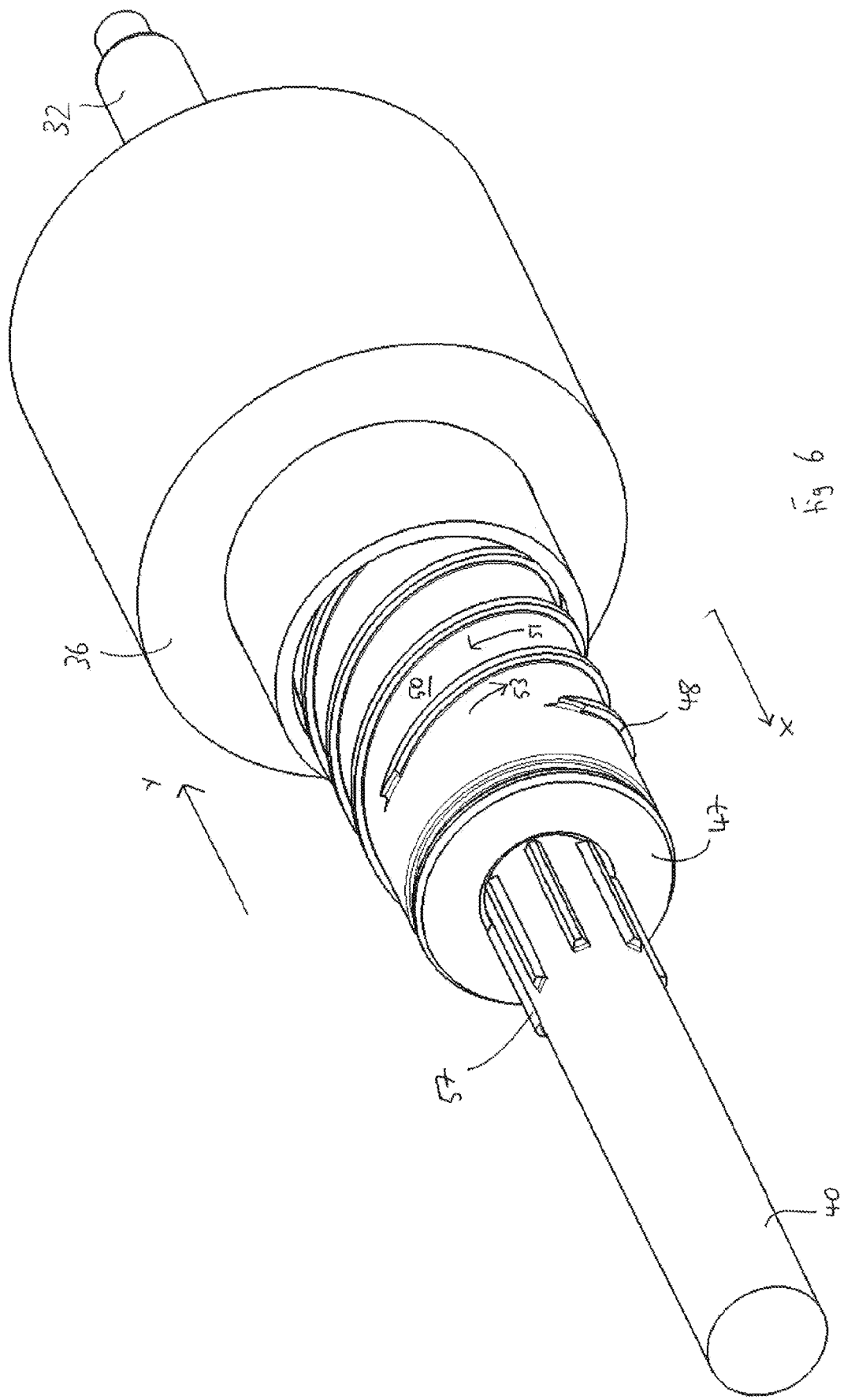
FIG. 6 is a perspective view of the rotary device of FIGS. 1 and 2 with part of the outer housing shown removed.

Referring to FIG. 6, some of the sections of the rotor have been cut away to enable explanation. The magnets 36 can be seen surrounding the housing 38. The helical ribs 48 can be seen defining helical paths 50. Drive shaft 40 can be seen coming out of the rotor. A number of splines 57 are provided, whose function will be described in more detail below. The counter-directional nature of the fluid flow is shown along the helical paths 50. In a first channel 51 fluid flows along the helical path but with the axial component of its flow being from the inlet end of the rotor to the distal end. In a second channel 53, fluid flows with the axial component of its flow being from the inlet end of the rotor to the distal end.

In the various examples described herein the counter directional flow paths are shown and described as being helical in nature. The use of helical paths generally ensures smooth and uniform fluid flow whilst enabling complete fluid coverage of the rotor housing walls. Other examples of tortuous paths could also be used. For example, the flow paths could be of any form that enable total or at least 90% surface coverage of the rotor housing walls and also enable counter-directional flow such that on the surface of the walls flow in both overall axial directions is possible. If helical flow is used, it is preferred that the angle of the helix is determined by a balance of pressure loss and heat transfer coefficient. A good balance may be given by a flow velocity around 2 m/s which with a helix angle of 50 degrees to the central axis. Typically, the helix angle is within a range of 5° to 85° relative to the rotating axis of the rotor is used. More preferably it is within the range 30° to 60° and most preferably within the range 30° to 45°.

Figure 7:
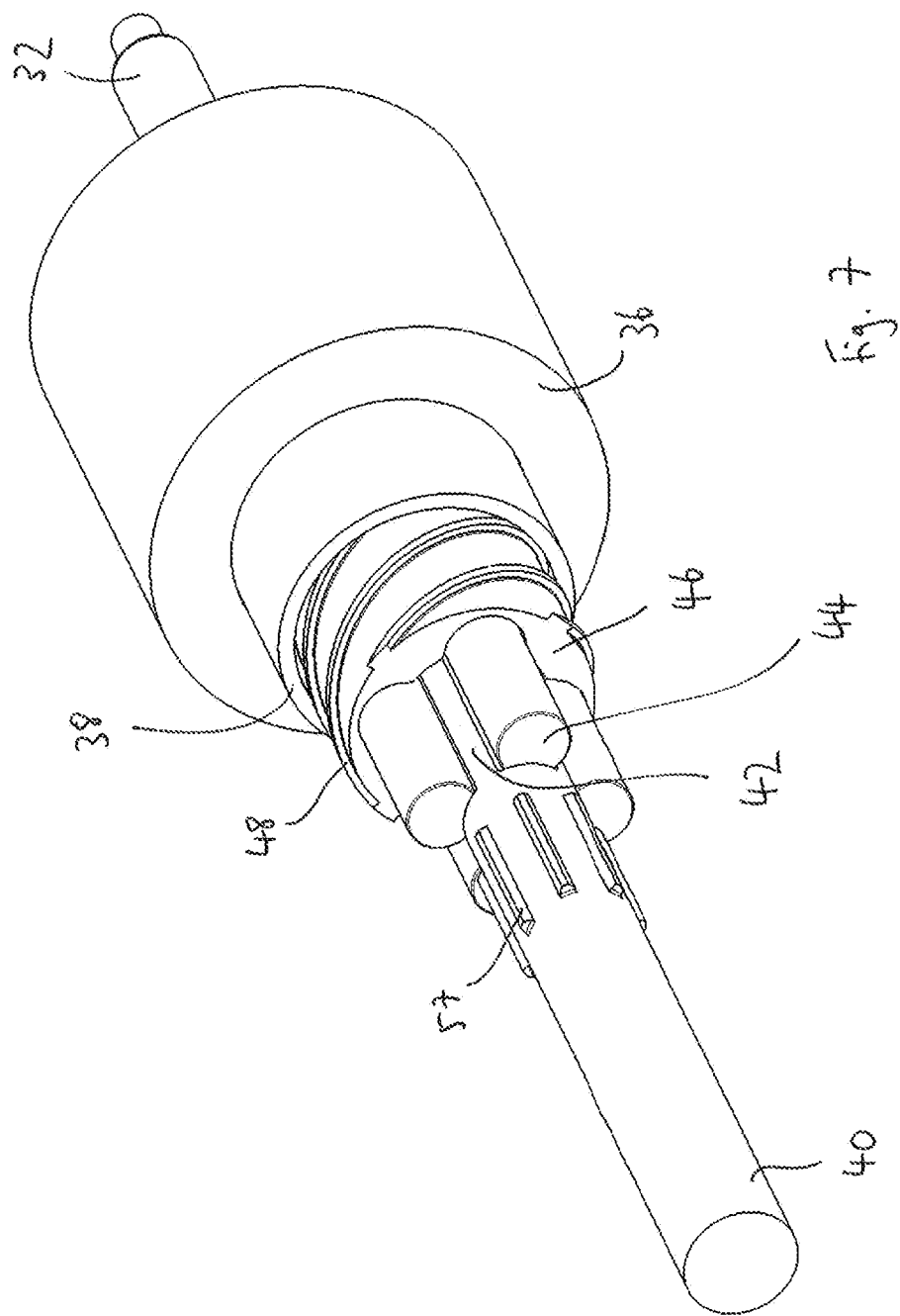
FIG. 7 is a perspective view of the rotary device of FIGS. 1 and 2 with part of the outer housing shown removed.

Referring to FIG. 7, a further section of the housing or wall 46 is shown cut away. This exposes a plurality of elastomeric elements 44 which, are arranged to drive rotation of the drive shaft 40 when the rotor rotates. The magnets 36 are caused to rotate by action of electromagnets (not shown). When the magnets rotate, the rotation is conveyed to the other components within the rotor, most notably the wall 38 and the helical ribbed housing 46. The housing or wall 46 includes a contoured inner surface that defines axial cut-outs or recesses. The recesses are provided with the elastomeric elements. Referring now to the shaft 40, 42 a number of axial cut-outs are provided which correspond to the cut-outs or recesses within the wall 46. These in combination with the cut-outs in the wall 46 surround or encase the elastomeric elements.

Due to the shape of the axial cut-outs within the housing 46 and the presence of the elastomeric members 44, rotation of the housing 46 drives corresponding rotation of the elastomeric elements, which in turn drive the shaft 40. In other words, rotation of the drive shaft 40 is created by driving the magnets 36 which in turn, via the interaction between the housing 46 and the elastomeric elements 44, cause the drive shaft to rotate. In the example shown 4 equally spaced elastomeric elements are used but it will be appreciated that the number could vary. In one example two oppositely mounted members are used and in another example 6 are used.

Due to the elastomeric qualities of the elements 44 torsional vibration of the drive shaft is minimised or entirely avoided. In this example, the elastomeric elements are generally elongate and cylindrical in form. Typically the diameter of each one can depend on the size of the motor, but might typically be between 5 and 20 mm or more preferably between 8 and 15 mm.

For clarity, FIG. 8A shows a version of the rotor of FIG. 7 cut off axially before the spline 57. FIG. 8B shows a transverse sectional view along the line AA in FIG. 3.

Referring again to FIG. 6, splines 57 can be seen on the drive shaft 40. The splines are not the primary or indeed necessary components to provide drive for the rotary device. This is achieved by interaction of the elastomeric elements and the shaping of the drive shaft 42. However, a number of splines are preferably provided which function as a stop for engagement with an onward axial component to which the drive shaft might be connected.

FIG. 8B shows a cross-section through the device of FIG. 8A. The elastomeric elements 44 are shown arranged between the housing 46 and drive shaft 42. The cross-section of the drive shaft 42 has a generally cruciform shape, but it will be understood that any appropriate shape can be used as long as it enables rotary coupling between the elastomeric elements 44. In the example shown, four helical ribs are provided therefore defining four parallel helical paths. In the example shown, two of the paths 64 provide for flow of the fluid in an inwards first axial direction and two of the paths 66 provide for fluid flow in the opposite axial direction. Thus, there is a counter flow of fluid within the rotary device.

Figure 8:
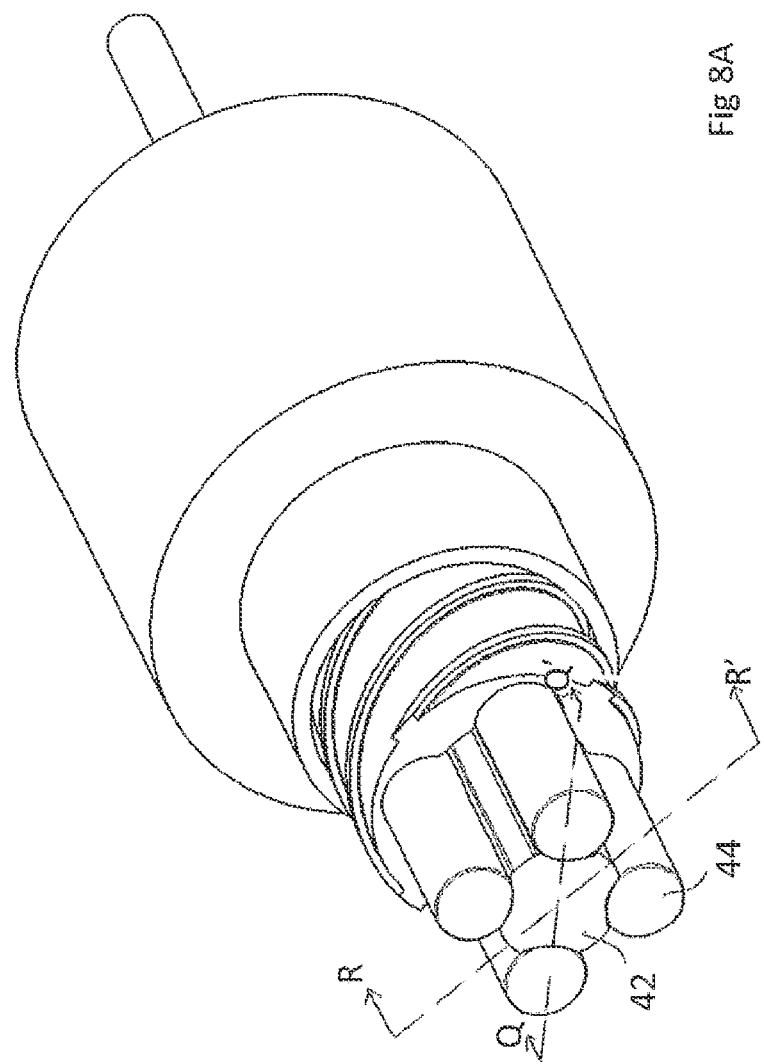
FIGS. 8A and 8B are a perspective and sectional end view of the rotary device of FIGS. 1 and 2 with part of the outer housing shown removed.
Figure 9:
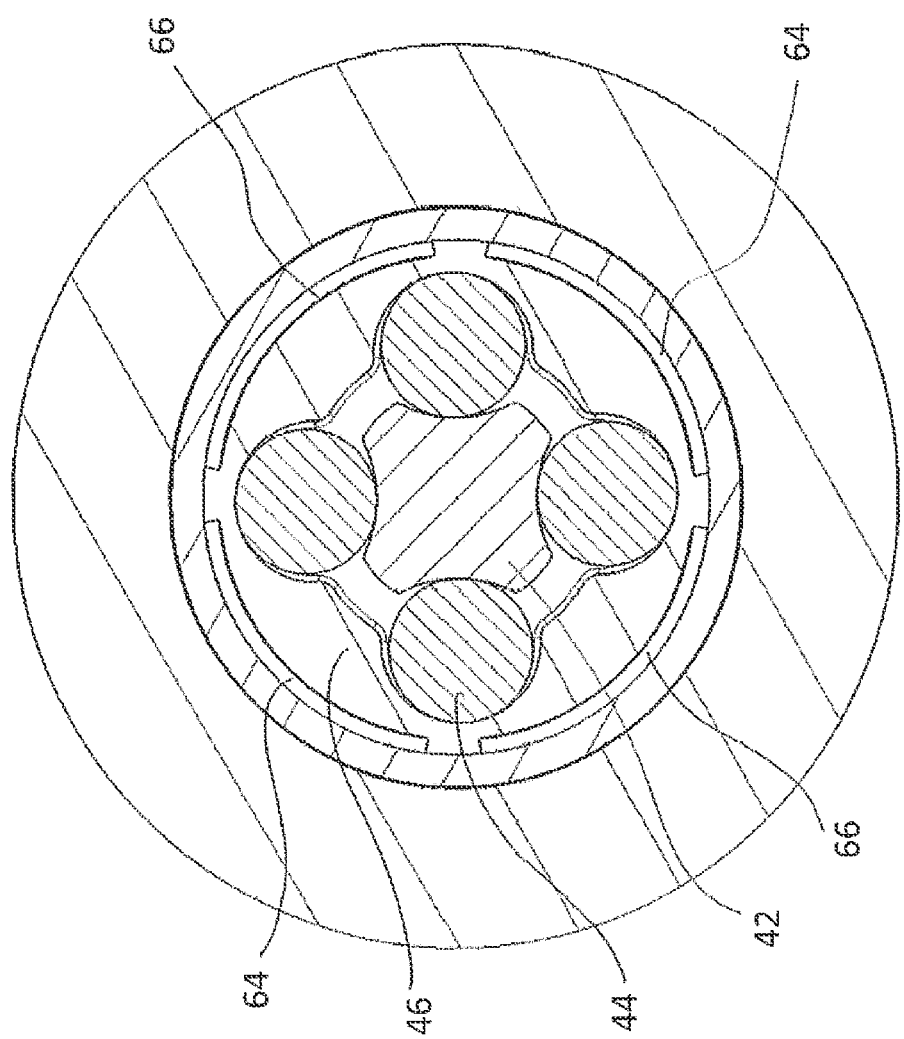
FIG. 9 is a longitudinal cross-section through the rotary device of FIGS. 2 and 3 along a different vertical axis from that of FIG. 4.

Referring now to FIG. 9, a longitudinal cross-section through the rotary device is shown. The position of the longitudinal cross-section is in the direction R-R' as shown in FIG. 8. Thus, the elastomeric elements 44 cannot be seen but the drive shaft 40 can. FIG. 9 serves to show the routing for the fluid on its return and exit from the rotary device. The rotary device comprises an axial conduit 60 which serves to receive fluid after it has passed first downwards in the axial direction and then returned in the direction Y. The fluid then passes along coaxial outlet 34 and is then removed for recycling or disposal.

Figure 10:
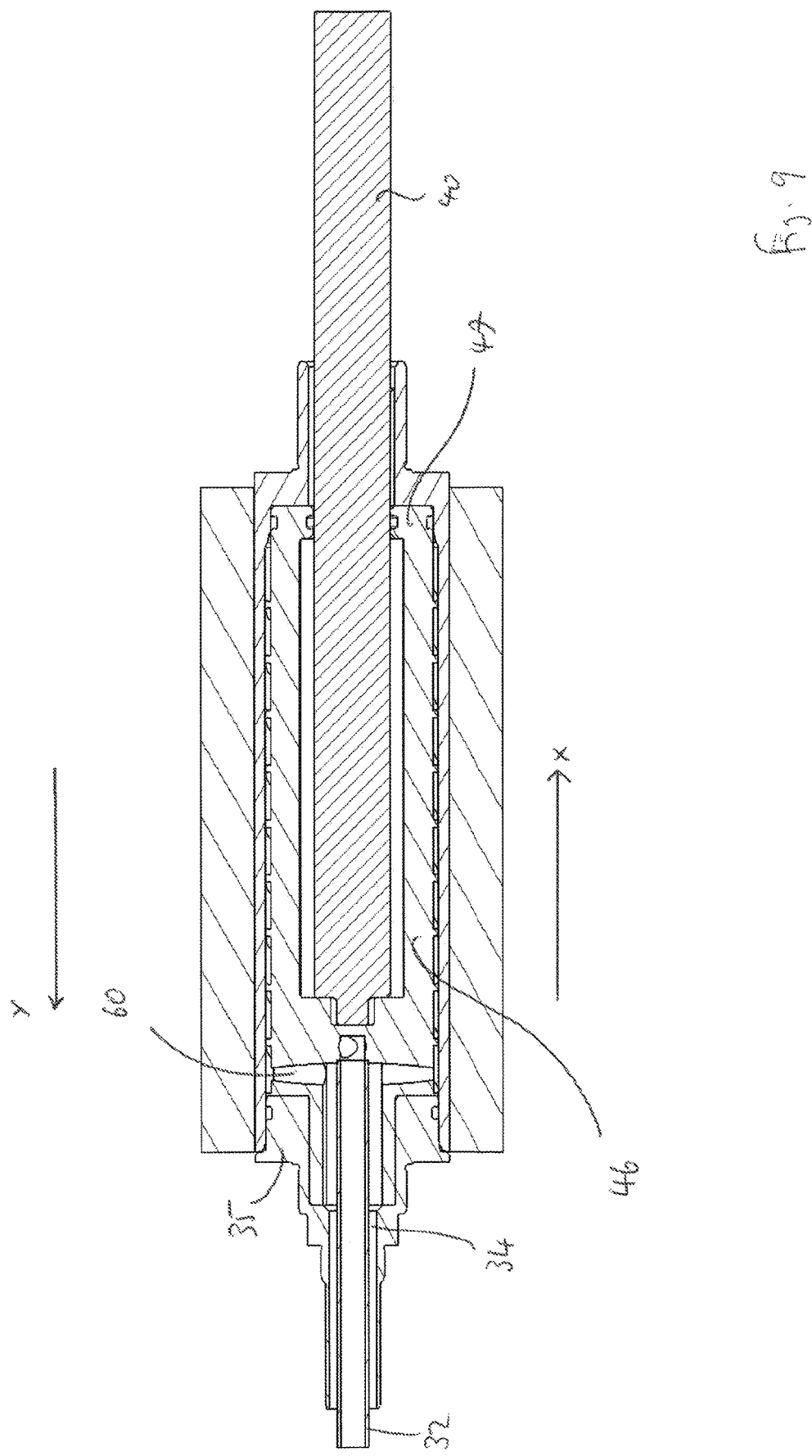
FIG. 10 is a quadrant of a transverse cross-section taken through the rotary device of FIGS. 1 to 9.

Referring now to FIG. 10, a quadrant of the rotary device, shown in transverse cross-section is shown.

The components referred to with respect to FIGS. 1 to 8 are numbered in the same way and their function will be clear from FIG. 10 itself. As can be seen, the housing 38 in combination with the inner housing 46 and the helical ribs 48 define a plurality of helical channels 50 which run axially along the length of the rotor. Elastomeric elements 44 are arranged within longitudinal recesses 58 within the housing 46.

The upstream section of the drive shaft 42 is shaped such that it also has a plurality of recesses 60 such that each elastomeric element 44 fits tightly between or within a longitudinal recess 58 within the housing 46 and the recess 60 within the drive shaft 42. Seen in transverse cross-section, the recess 60 has raised sections 62 such that the elastomeric element 44 is effectively enclosed between the drive shaft 42 and the housing 46. Upon rotation of the housing 46 (due to driving of the rotor as described above) a tangential force F will be applied to the elastomeric element. Subsequently the force will be coupled to the drive shaft 42 by interaction between the elastomeric element 44 and the shaped recess 60 within the drive shaft. Thus, the drive shaft may be driven rotationally by the rotary device.

Figure 11:
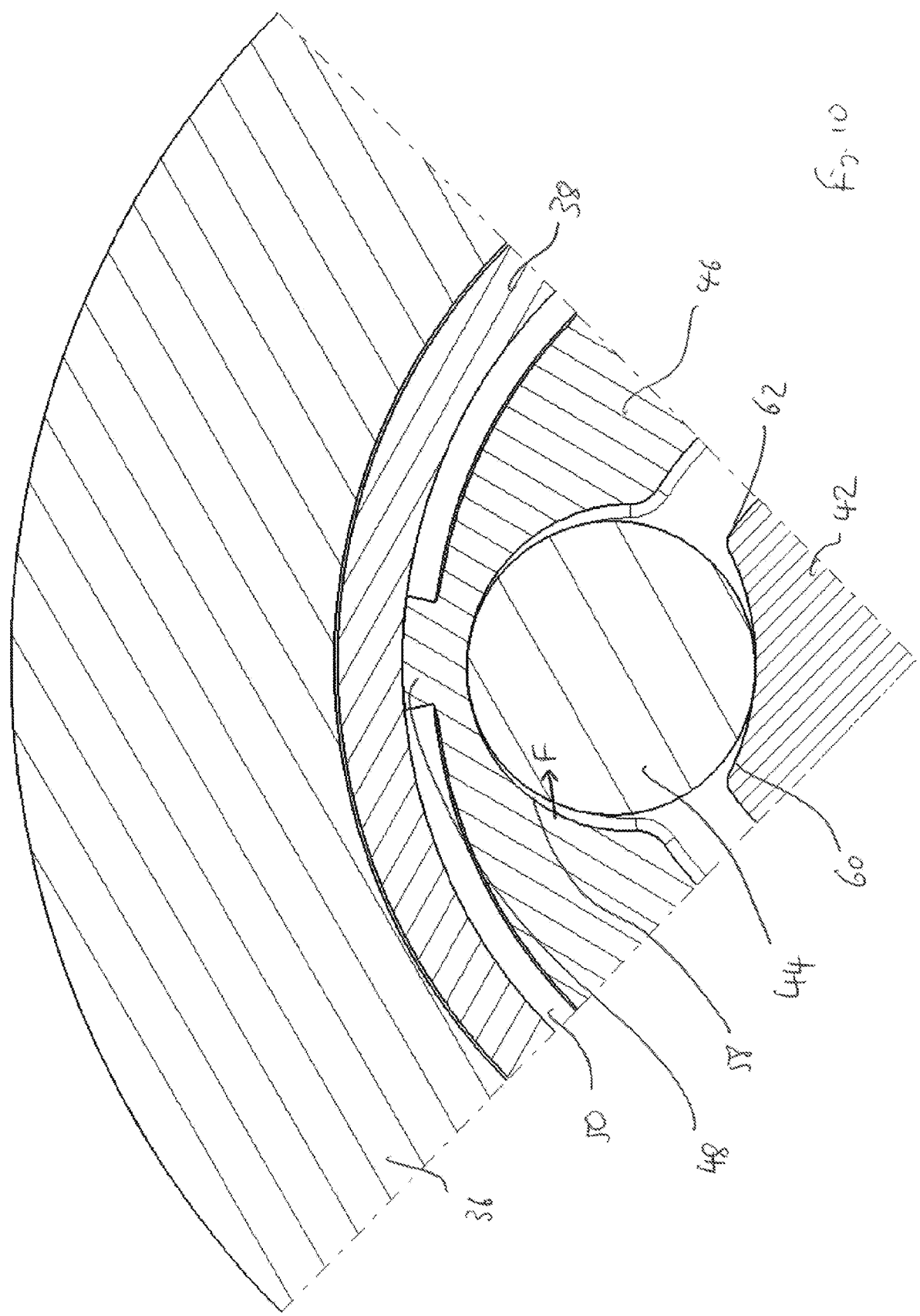
FIG. 11 is a perspective view of a rotary device according to a second embodiment.
Figure 12:
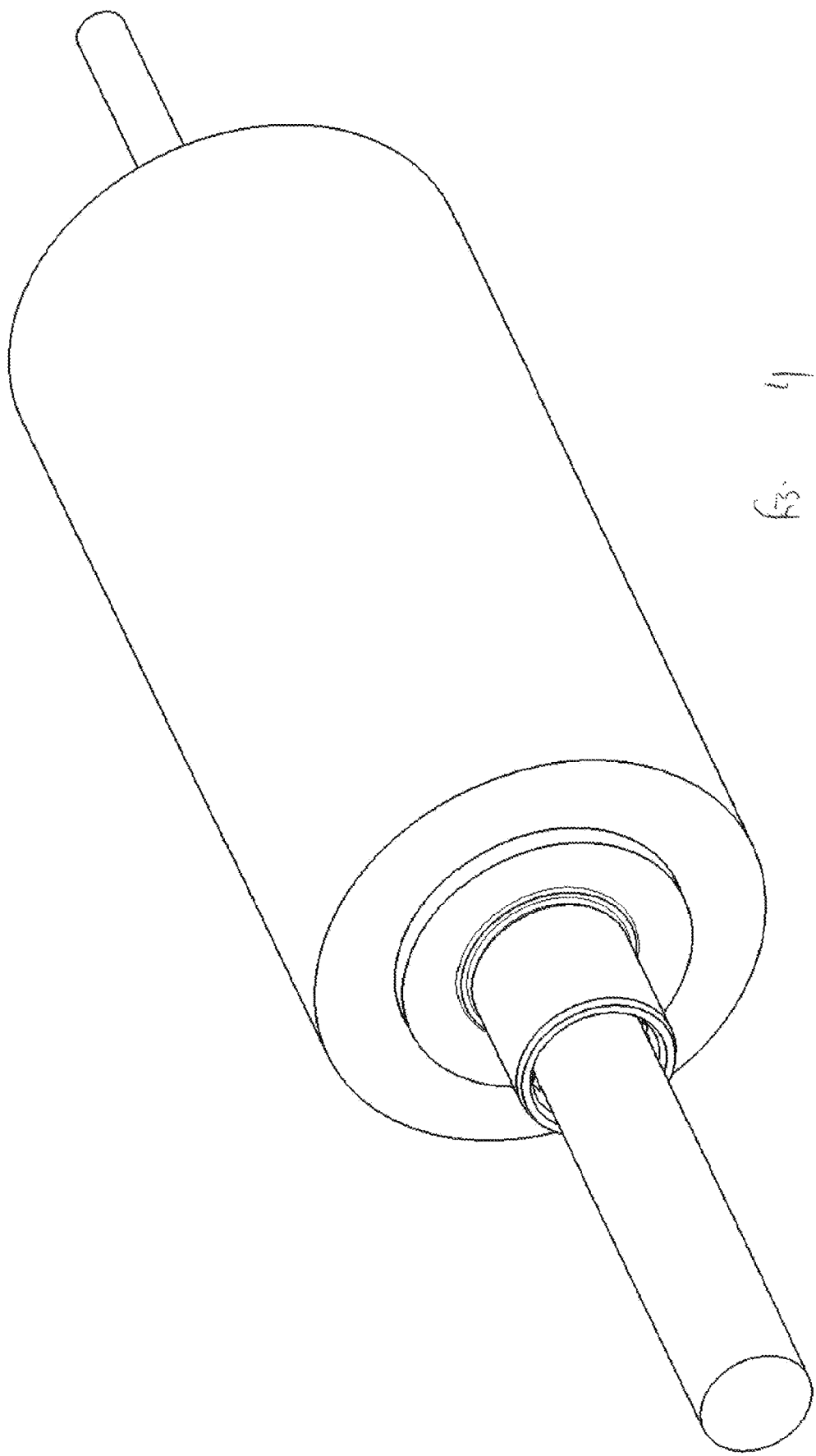
FIG. 12 is a perspective view of the rotary device of FIG. 11 with part of the outer housing removed.
Figure 13:
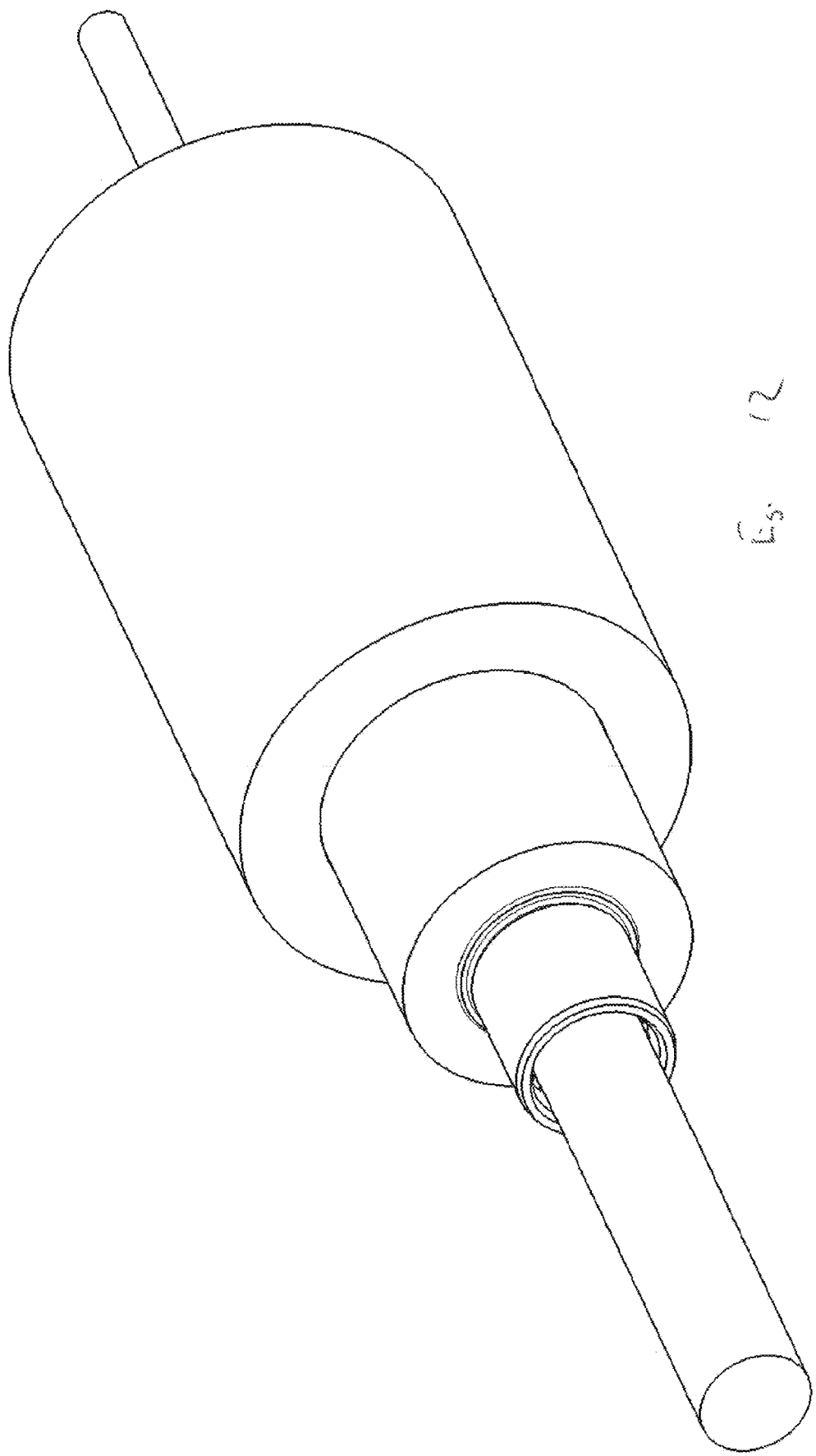
FIG. 13 is a cross-sectional longitudinal view through the rotary device of FIGS. 11 and 12.

FIG. 11 shows a schematic representation of a rotor from a rotary device according to a further embodiment. FIG. 12 shows the rotor of FIG. 11 with parts removed for clarity. FIG. 13 is a longitudinal cross-sectional view of the rotary device of FIGS. 11 and 12.

A number of components of the rotor of FIG. 13 are the same of those of the first embodiment described with reference to FIGS. 1 to 10. Detailed description of these will not be repeated but it will be understood that the method of operation of common components will be substantially or identically the same.

Figure 14:
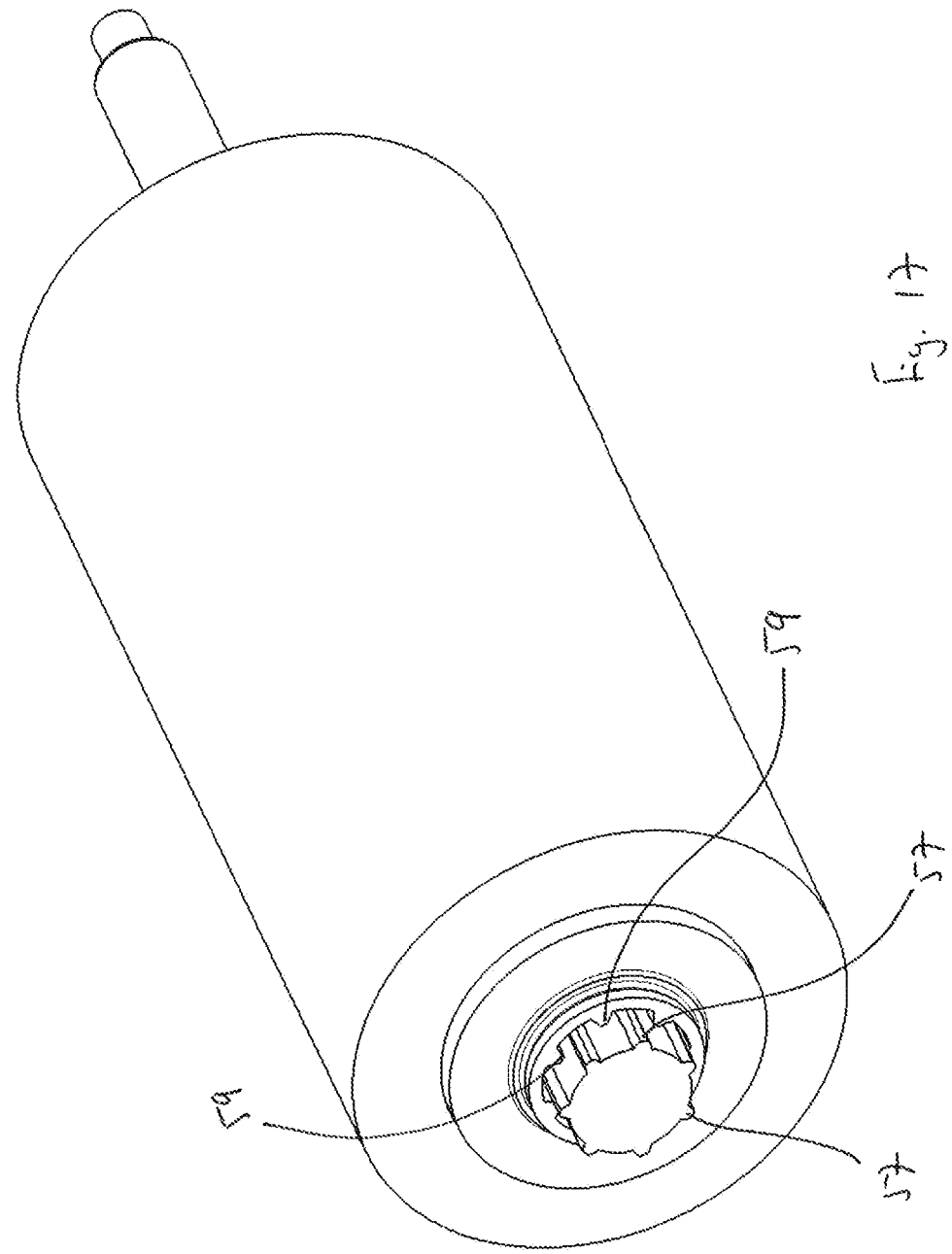
FIG. 14 is a perspective view of the rotary device of FIGS. 11 and 12 with a number of the outer components removed.

The rotor of FIG. 13 comprises a drive shaft 70 having a section 72 arranged within the housing of the rotor. In the view of FIG. 13, it may appear that the drive shaft entirely fills the housing of the rotary device. In fact the structure of the inner portion 72 includes a first plurality of radial projection or fins as seen in FIG. 14. The fins 74 are radially coupled to the drive shaft 70. In addition, a second plurality of fins is provided, also radially mounted, although the second plurality of fins 76 are each fixedly coupled to the housing 46. In other words, the rotor has first and second pluralities of radially interdigitated fins in which a first plurality of the fins 74 is fixedly mounted to the drive shaft and a second plurality 76 is fixedly mounted to an inner wall 46 of the rotor housing. More generally it can be seen that the space or void within the rotor housing contains the interdigitated fins which provide an output for the rotary power. As explained above the space or void can be used for other functions as well as that shown in and described with reference to, say, FIG. 14.

Examples of other components, elements or functionality that could be provided within the void include other ways or means to provide torsional damping. In one example, a hydraulic damper or damping mechanism could be included. In this case there would be provided some interdigitation between a central member and the outer housing with openings or grooves provided for the passage of a hydraulic damping fluid. In a manner similar to that shown in FIG. 14 in which elastomeric elements are provided between the interdigitated fingers 74 and 76, instead of the use of elastomeric elements, a hydraulic fluid is provided and openings or grooves are provided within the interdigitated members to provide the damping.

In another example, a rotary friction damper is provided. The rotary friction damper comprises one or both of metallic spring elements (for example slender spokes) to provide a defined rotational stiffness (i.e. in units of Nm/radian) and axially preloaded spring elements (for example conical 'Belleville' washers) where any small amounts of rotational displacement permitted by spring elements would cause slip of the axially preloaded elements and from friction in between the elements carrying the axial preload, a defined resistance to the rotation (i.e. in units of Nm) thereby providing damping.

In another example, a centrifugal pendulum absorber is provided. The centrifugal pendulum absorber works by storing energy and returning it to the vibration system at the appropriate time in order to increase drivetrain durability and/or improve noise, vibration and harshness (NVH) rather than converting rotational kinetic energy into heat as a damper. One example of an application of a pendulum damper would be to incorporate cylindrical pockets inside the rotor which house metallic cylinders of smaller diameter (the *pendula*) which are free to oscillate inside the pockets. It will be appreciated that the rotary friction damper and the centrifugal pendulum absorber are merely examples of components or functionality that could be provided within the space now made available by the absence of any central axial fluid conduit within the rotor.

As also explained above, in one embodiment, the void could be left empty so as to reduce the overall mass of the rotor and/or motor. In one further example, a drive coupling, e.g. a spline could be integrated within the body of the rotor, again, reducing mass and overall package volume.

More generally, it could simply be the case that the void is left empty which serves to reduce the overall weight of the rotor.

A space is defined between each pair of adjacent fins (a "pair" comprising one fin from the first plurality and one from the second plurality) and arranged within the space is an elastomeric element 78 of generally longitudinal prismatic form. In this example the cross-section is generally in mushroom shape but any suitable shape can be used. Referring to FIG. 16, the elastomeric material 78 can be seen arranged between a first one of the radially inward projecting radial fins 76 and a first of the radially outward projecting fins 74. A clearance 80 (FIG. 16) is provided between the radially inward projecting fins 76 and the central support 82 of the drive shaft.

As the rotor is caused to rotate by virtue of power being provided to windings in surrounding electromagnets (not shown), the fins 76, fixedly mounted to the housing 46 rotate with the housing and thereby apply compressive force to the elastomeric elements 78 which in turn apply a driving force to the drive shaft 70. Thus, the elastomeric elements 78 are effectively compressed between the adjacent radial fins from the first and second pluralities. This means of driving the output shaft ensures that the drive is damped due to the compressibility of the elastomeric elements.

In the example of FIG. 14, only a single elastomeric element 78 is shown but it will be appreciated that in each of the sectors between adjacent pairs of fins 74 and 76, there will be provided an elastomeric element. FIG. 19 shows two elastomeric elements 78 provided between fins 74 and 76. Referring to FIG. 13, a detailed description of the fluid flow will not be repeated since it is substantially the same as that described with reference to FIGS. 4 and 9.

The embodiment described with reference to FIGS. 11 to 19 provide the same advantages as that described with reference to FIGS. 1 to 10, as compared to the rotary device of WO-A-2014/057245. The use of bidirectional tortuous paths on an outer surface of the rotor housing, provides volume within the rotary device which is used for incorporation of other elements and in particular is used for inclusion of low-stiffness and high-damping elastomeric elements.

The elastomeric material from which the elastomeric elements are formed may be any appropriate elastomer such as a natural rubber or higher operating temperature FKM material. By use of this means of driving the drive shaft of a rotary device, a rotary device can be provided that addresses the problems of noise, vibration and hardness of output. Furthermore, due to the fact that the rotary device will typically be used within a hybrid electric vehicle and therefore will need coupling to the output of an engine or a common gearing system the ability to provide damping and limit the torsional vibration is a significant advantage.

The longitudinal extent of radial fins in the embodiment of FIGS. 11 to 19 or indeed the elastomeric elements and interacting curved surfaces of the embodiment of FIGS. 2 to 10 is preferably at least 80% of the length of the rotor housing and more preferably along the whole length of the rotor housing. This distributes heat generation along the whole or substantially the whole of the length of the rotor and therefore minimises the risk of overheating at any particular position along the axial length.

Figure 20A:
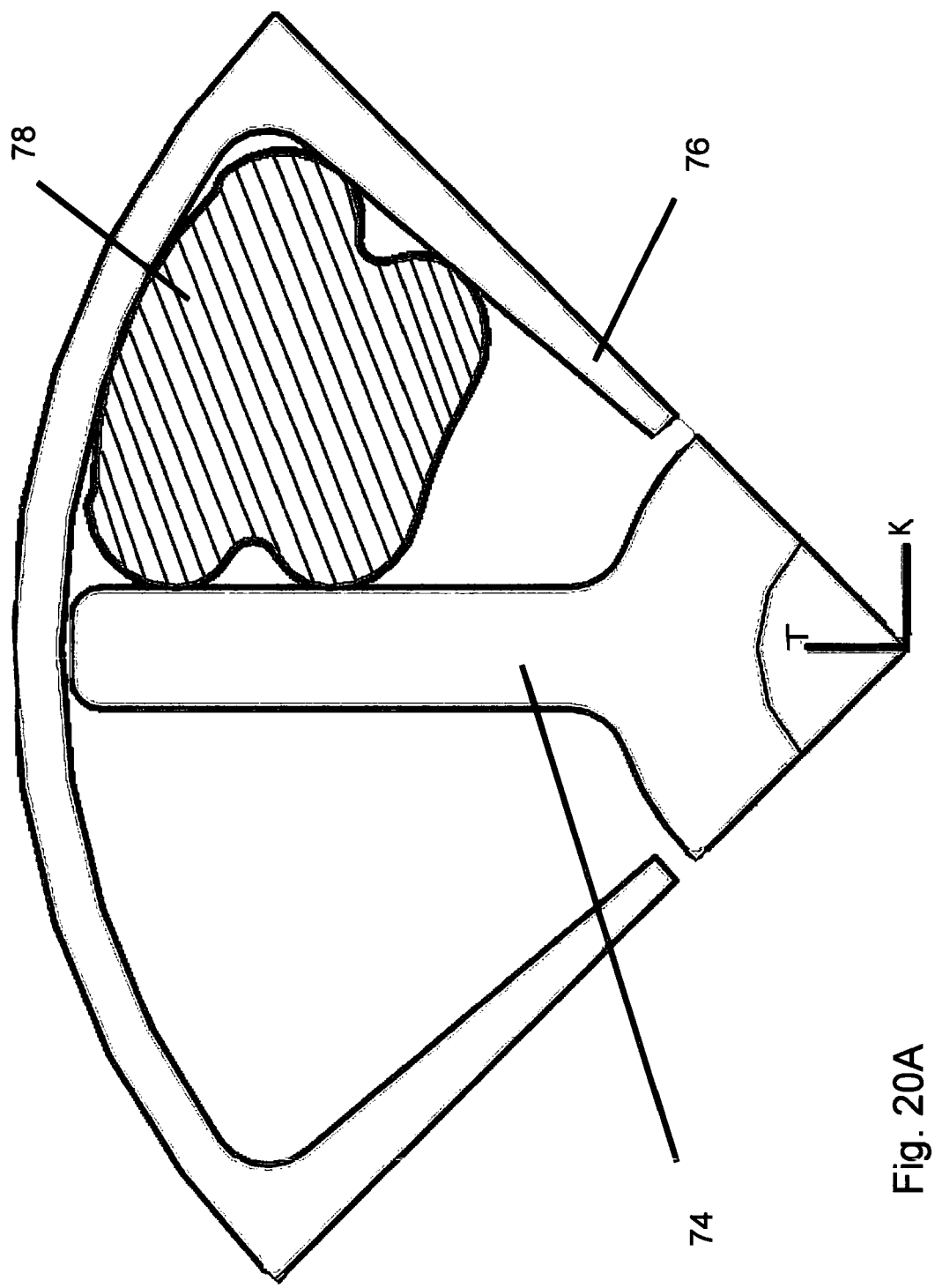
FIGS. 20A to 20C show schematic views of a quadrant of a rotor in operation.
Figure 20B:
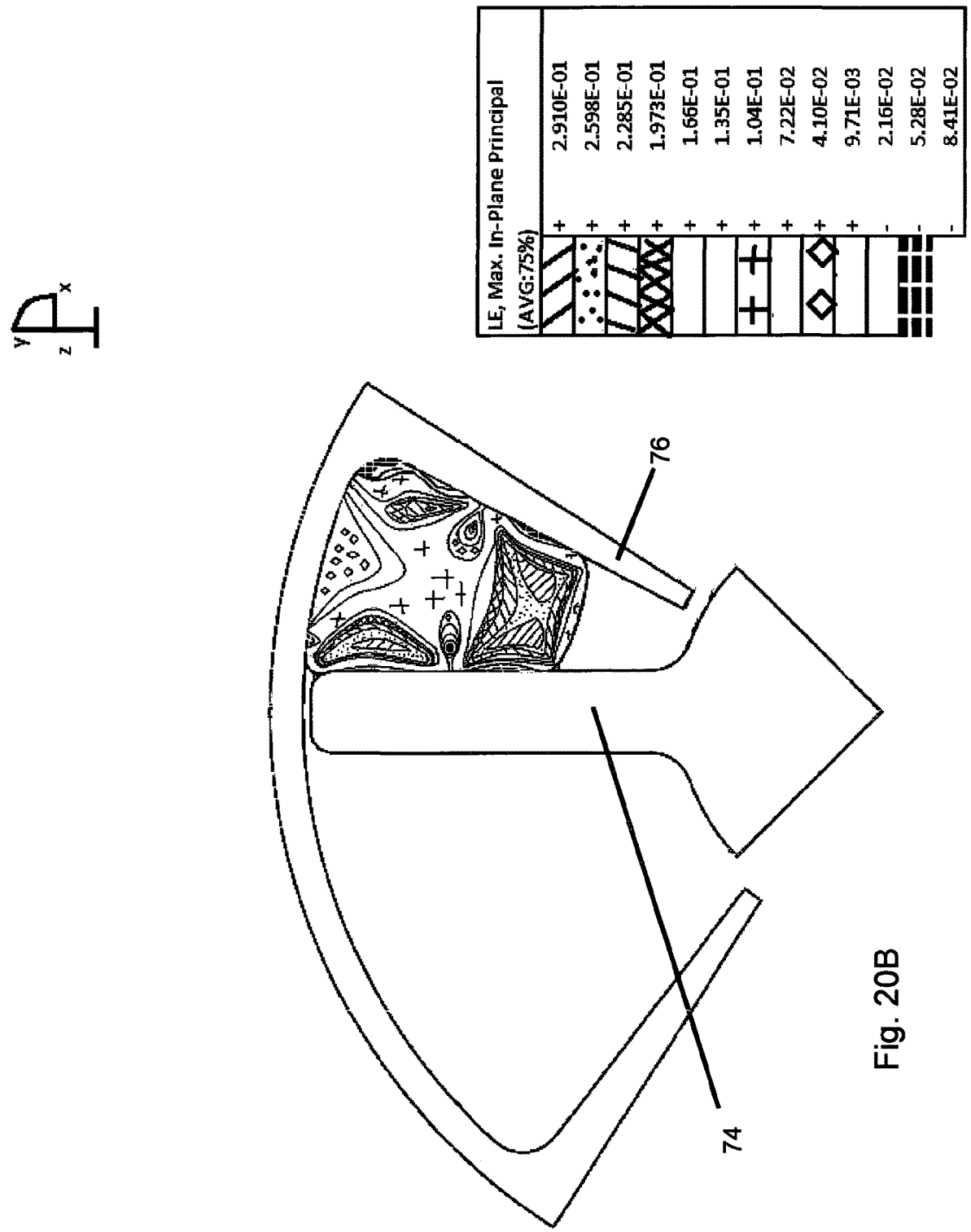

FIG. 20 shows a schematic view of a quadrant of the rotor in which the elastomeric element 78 is undergoing compression due to movement of the housing relative to the drive shaft 74. FIG. 20A shows a pre-compressed position and FIG. 20B shows a compressed position with the elastomeric element 78 under strain. In this particular example, the strain plot is shown at a torque of 40 Nm, with a 12.5° twist at an average rate of 183 Nm/rad.

The shape of the elastomeric elements 78 in FIG. 20B shows the deformation that it is expected to undergo in operation. The cross-section of the elastomeric element is chosen so as to maximise the radial distribution of the compressive force experienced by the elastomeric element. This further ensures that heat is distributed more evenly throughout the elastomeric element. In the example shown, the transverse cross-section of the elastomeric element is generally mushroom shape, i.e. it has a first radially inner portion of a first diameter and a second portion, radially more outwards than the first portion, having a larger cross-section. The cross-section preferably has a null or void region 84. This is particularly advantageous since it provides space for the deformed elastomer to move into upon compression of the overall elastomeric body.

In the example shown, a number of splines 57 are provided. These can engage with radially inwardly projecting teeth 59 on the rotor housing to limit the travel and torque the elastomer elements must support and/or provide a change in the torsional stiffness characteristic vs twist angle. The primary means of rotary engagement between the output shaft and the rotor housing is the elastomeric elements and the way in which rotation of the rotor housing causes compression of the elastomeric elements which then drives the output shaft. However the splines 57 and inwardly projecting teeth 59 define limits to the relative rotation between the shaft and the housing. In normal operation it is not to be expected that there will be engagement between the splines 57 and teeth 59.

Each of the splines 57 will ordinarily move within one of the arcuate annular sections 61 (see FIG. 18) defined between each pair of inwardly projecting teeth 59. They will only encounter and engage the teeth 59 as a limit to the relative rotation with the rotor housing. The actual number of splines and angular separation and the angular range of the arcuate annular sections 61 can be selected as needed. In one example arranged around the rotor housing are 4 inwardly projecting teeth separated by 90 degrees and there are correspondingly 4 splines, one in each of the defined arcuate annular sections 61.

In some examples in each arcuate annular section 61 there are 2 splines.

In one example, the angular separation of the splines is configured together with the angular range or length of the arcuate annular sections 61 such that upon engagement all of the spline and teeth pairs simultaneously engage.

Figure 20C:
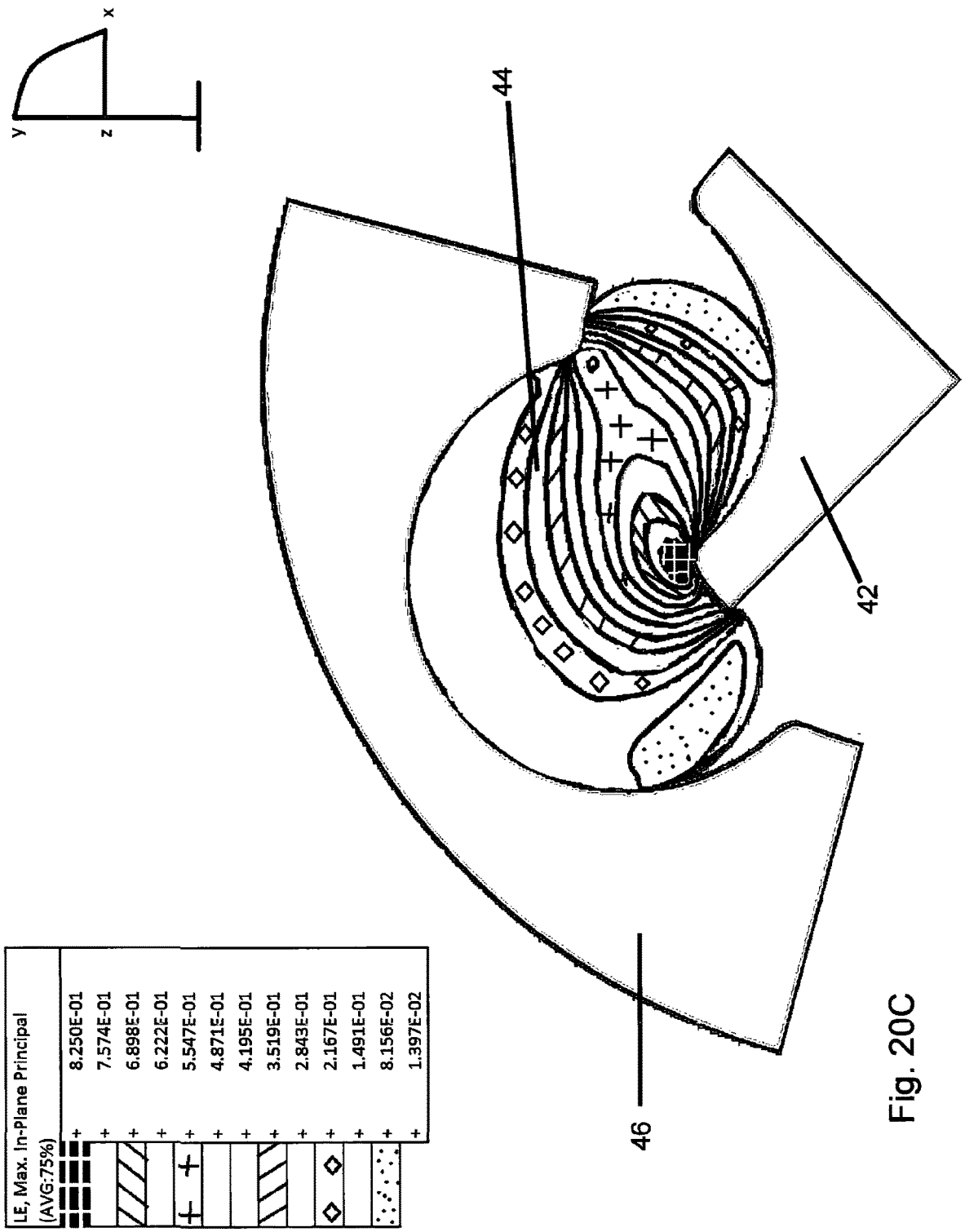

FIG. 20C is a view showing the embodiment of FIGS. 1 to 10 in operation. In this case, the cross-section of the housing 46 can be seen defining a channel 58 within which the elastomeric member 44 is positioned. A drive shaft 42 is driven by the deformed and compressed elastomeric member 44 itself being driven by rotation of the housing 46 forming part of the rotor. In this particular example, the strain plot is shown at a torque of 40 Nm with a 30° twist at an average rate of 76 Nm/rad.

Exemplary embodiments of the present disclosure have been described with particular reference to the examples illustrated. However, it will be appreciated that variations and modifications may be made to the examples described and are within the scope of the present invention, which is defined by the claims that follow.

The invention claimed is:

1. A motor for generating rotary power, the motor comprising:
   a stator for receiving electrical power;
   a rotor arranged coaxially with respect to the stator and having one or more magnets arranged thereon so that in response to the stator receiving the electrical power, the rotor is caused to rotate, the rotor comprising a rotor housing having first and second ends, and the magnets being arranged around the housing, and wherein the housing has one or more tortuous paths for the flow of coolant extending along the length of the rotor housing, and being configured to direct flow from the first end of the rotor housing to the second end and back to the first end; and a bidirectional tortuous flowpath extending along the one or more tortuous paths from the first end of the rotor housing to the second end of the rotor housing and from the second end of the rotor housing returning to the first end of the rotor housing, the bidirectional tortuous flowpath configured to transport the coolant from the first end of the rotor housing to the second end of the rotor housing and to return to the coolant to the first end of the rotor housing from the second end of the rotor housing.

2. A motor according to claim 1, comprising one or more elastomeric elements within the housing configured to drive the output shaft upon operation of the motor.

3. A motor according to claim 2, in which the rotor housing has a substantially cylindrical shape outer shape and an inner wall having one or more radial projections for engagement with the one or more elastomeric elements.

4. A motor according to claim 3, in which the radial projections are radial fins projecting axially inwards towards the output shaft.

5. A motor according to claim 4, in which the output shaft has a plurality of outwardly projecting radial fins interdigitated with the inwardly projecting radial fins of the rotor housing.

6. A motor according to claim 5, wherein there are defined between the inwardly projecting fins and the outwardly projecting fins angular sectors and wherein the elastomeric elements are provided within the sector regions.

7. A motor according to claim 3, wherein the output shaft has a contoured surface having one or more recesses to define with the contours of the rotor housing longitudinal voids for housing the one or more elastomeric elements.

8. A motor according to claim 3, in which the motor comprises a plurality of elastomeric elements in the form of longitudinal members.

9. A motor according to claim 2, in which the elastomeric elements are formed of a material selected from natural or nitrile rubber, flouroelastomer, silicone or other polymer.

10. A motor according to claim 2, in which the length of the or each elastomeric element is at least 80% of the length of the rotor housing.

11. A motor according to claim 1, in which the tortuous paths are helical.

12. A motor according to claim 11, wherein there are two helical paths in which fluid in use flows from the first end to the second two helical paths in which fluid in use flows from the second end to the first end.

13. A motor according to claim 11, in which the helix angle is between 5° and 85° to the rotating axis.

14. A motor according to claim 11, in which the helix angle is within the range 30° to 45°.

15. A motor according to claim 1, in which the tortuous paths are defined between 2 concentric layers of the inner wall.

16. A motor according to claim 15, in which one of the concentric layers has helical ribs formed thereon to define in combination with the other the helical paths.

17. A motor according to claim 1, comprising an output shaft arranged at least partially axially within the rotor housing, the rotor housing having an inner wall being shaped for engagement with and so as to drive the output shaft.

18. A motor according to claim 1, in which there is defined a central void within the rotor housing.

19. A method of operating a motor, wherein the motor comprises a stator for receiving electrical power and a rotor arranged coaxially with respect to the stator, the rotor comprising a rotor housing having first and second ends, and wherein the housing has one or more tortuous paths for the flow of coolant extending along the length of the rotor housing, and the rotor has an output shaft coupled thereto, the method comprising:

providing flow of a coolant along the one or more tortuous paths both from the first end of the rotor housing to the second end and back to the first end;

providing flow of the coolant along a bidirectional tortuous flowpath extending along the one or more tortuous paths from the first end of the rotor housing to the second end of the rotor housing and from the second end of the rotor housing returning to the first end of the rotor housing, the bidirectional tortuous flowpath configured to transport the coolant from the first end of the rotor housing to the second end of the rotor housing and to return to the coolant to the first end of the rotor housing from the second end of the rotor housing; and providing electrical power to the stator so as to cause the rotor to rotate.

20. A method according to claim 19, comprising providing elastomeric elements to provide the coupling of the rotor to the output shaft.

21. A rotary device for generating electricity, the rotary device comprising:

a stator having windings;

a rotor arranged coaxially with respect to the stator and having one or more magnets arranged thereon so that in response to the rotor being driven in a rotary manner, electrical power is generated within the windings of the stator, the rotor comprising a rotor housing having first and second ends, the magnets being arranged around the housing, and wherein the housing has one or more tortuous paths for the flow of coolant extending along the length of the rotor housing, and being configured to direct flow from the first end of the rotor housing to the second end and back to the first end; and a bidirectional tortuous flowpath extending along the one or more tortuous paths from the first end of the rotor housing to the second end of the rotor housing and from the second end of the rotor housing returning to the first end of the rotor housing, the bidirectional tortuous flowpath configured to transport the coolant from the first end of the rotor housing to the second end of the rotor housing and to return to the coolant to the first end of the rotor housing from the second end of the rotor housing.

* * * * *